(12) United States Patent
Amano

(10) Patent No.: US 11,181,745 B2
(45) Date of Patent: Nov. 23, 2021

(54) DISPLAY DEVICE, HEAD-MOUNTED DISPLAY APPARATUS AND DISPLAY METHOD

(71) Applicant: SEIKO EPSON CORPORATION, Tokyo (JP)

(72) Inventor: Atsushi Amano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/083,245

(22) Filed: Oct. 28, 2020

(65) Prior Publication Data

US 2021/0132391 A1 May 6, 2021

(30) Foreign Application Priority Data

Nov. 1, 2019 (JP) .............................. JP2019-199836

(51) Int. Cl.
 *G02B 27/01* (2006.01)
 *G09G 3/3258* (2016.01)
 *G09G 3/3233* (2016.01)

(52) U.S. Cl.
 CPC ....... *G02B 27/0172* (2013.01); *G09G 3/3233* (2013.01); *G09G 3/3258* (2013.01); *G02B 2027/0114* (2013.01); *G09G 2300/0426* (2013.01); *G09G 2300/0819* (2013.01); *G09G 2300/0842* (2013.01); *G09G 2300/0861* (2013.01); *G09G 2310/0289* (2013.01); *G09G 2310/0297* (2013.01); *G09G 2310/08* (2013.01); *G09G 2320/0233* (2013.01); *G09G 2320/0285* (2013.01); *G09G 2320/0295* (2013.01); *G09G 2320/045* (2013.01)

(58) Field of Classification Search
 CPC ...... G09G 3/30–3291; G09G 2320/029–0295; G09G 2320/043–048; G09G 2320/0233
 See application file for complete search history.

(56) References Cited

U.S. PATENT DOCUMENTS

| 6,995,519 | B2* | 2/2006 | Arnold | G09G 3/3225 |
| | | | | 315/169.3 |
| 7,161,566 | B2* | 1/2007 | Cok | G09G 3/3208 |
| | | | | 345/76 |
| 10,262,571 | B2* | 4/2019 | Song | G09G 3/2074 |
| 10,997,914 | B1* | 5/2021 | Hwang | G09G 3/3688 |
| 2002/0171611 | A1* | 11/2002 | Cok | G09G 3/3233 |
| | | | | 345/82 |
| 2004/0070558 | A1* | 4/2004 | Cok | G09G 3/3258 |
| | | | | 345/76 |

(Continued)

FOREIGN PATENT DOCUMENTS

JP 2008102499 5/2008

*Primary Examiner* — Patrick F Marinelli
(74) *Attorney, Agent, or Firm* — JCIPRNET

(57) ABSTRACT

A change amount of illuminance of a luminescent color by a light-emitting element is acquired, and based on the change amount acquired for each luminescent color, drive power to be supplied to the light-emitting element of each luminescent color is calculated in order to reduce the change amount. In addition, light emission of each light-emitting element of each luminescent color is controlled with the calculated drive power to control display of the display unit.

7 Claims, 15 Drawing Sheets

(56) References Cited

U.S. PATENT DOCUMENTS

| | | | |
|---|---|---|---|
| 2004/0150590 A1* | 8/2004 | Cok | G09G 3/3208 |
| | | | 345/76 |
| 2005/0110420 A1* | 5/2005 | Arnold | G09G 3/3225 |
| | | | 315/169.3 |
| 2008/0100645 A1 | 5/2008 | Nitta | |
| 2009/0078852 A1* | 3/2009 | Lin | G09G 3/3413 |
| | | | 250/205 |
| 2014/0118319 A1* | 5/2014 | Jeon | G09G 3/035 |
| | | | 345/207 |
| 2016/0307493 A1* | 10/2016 | Song | G09G 3/3225 |
| 2017/0178565 A1* | 6/2017 | Fujimaki | G09G 3/003 |
| 2019/0318698 A1* | 10/2019 | Yamazaki | G09G 3/3648 |
| 2020/0221166 A1* | 7/2020 | Park | H04N 21/4318 |
| 2021/0005160 A1* | 1/2021 | Lee | G09G 3/3225 |
| 2021/0166606 A1* | 6/2021 | Han | G09G 3/2003 |

* cited by examiner

DISPLAY DEVICE, HEAD-MOUNTED DISPLAY APPARATUS AND DISPLAY METHOD

The present application is based on, and claims priority from JP Application Serial Number 2019-199836, filed Nov. 1, 2019, the disclosure of which is hereby incorporated by reference herein in its entirety.

BACKGROUND

1. Technical Field

The present disclosure relates to a display device using a self-emitting element, and a display method of an image.

2. Related Art

In a display device capable of expressing multiple colors using liquid crystals, organic EL, or the like, color balance is adjusted. In color display devices using three primary colors, such as RGB, a device has been known in which a mechanism is incorporated for adjusting intensity of each color of RGB to adjust white at an initial point of time as a display device, and then, assuming a case where color balance collapses due to a change over time in respective elements representing RGB, adjusting light emission of the respective elements. For example, a display device described in JP-A-2008-102499 uses a plurality of liquid crystal cells provided with an RGB filter, detects a change in illuminance of back light, and controls transmittance of each liquid crystal cell in accordance with the change in illuminance.

The display device described in JP-A-2008-102499 is superior that suppresses color unevenness on a display, but brightness of each color is controlled by the transmittance of the liquid crystal cell, thus when the back light darkens, even when the transmittance is set to 100%, a color corresponding to that liquid crystal cell cannot be brightened.

SUMMARY

A display device according to the present disclosure includes a display unit at which a plurality of light-emitting elements having different luminescent colors are arranged, illuminance of the light-emitting element varying in accordance with supplied power, a change amount acquisition unit configured to acquire a change amount of illuminance of the luminescent color of the light-emitting element, and a calculation unit configured to, based on the change amount acquired for each light-emitting element of each luminescent color, calculate drive power to supply to the light-emitting element in order to reduce the change amount, and a display control unit configured to control light emission of the light-emitting element, with the calculated drive power, to control display on the display unit.

DESCRIPTION OF EXEMPLARY EMBODIMENTS

A. First Exemplary Embodiment

Figure 1:
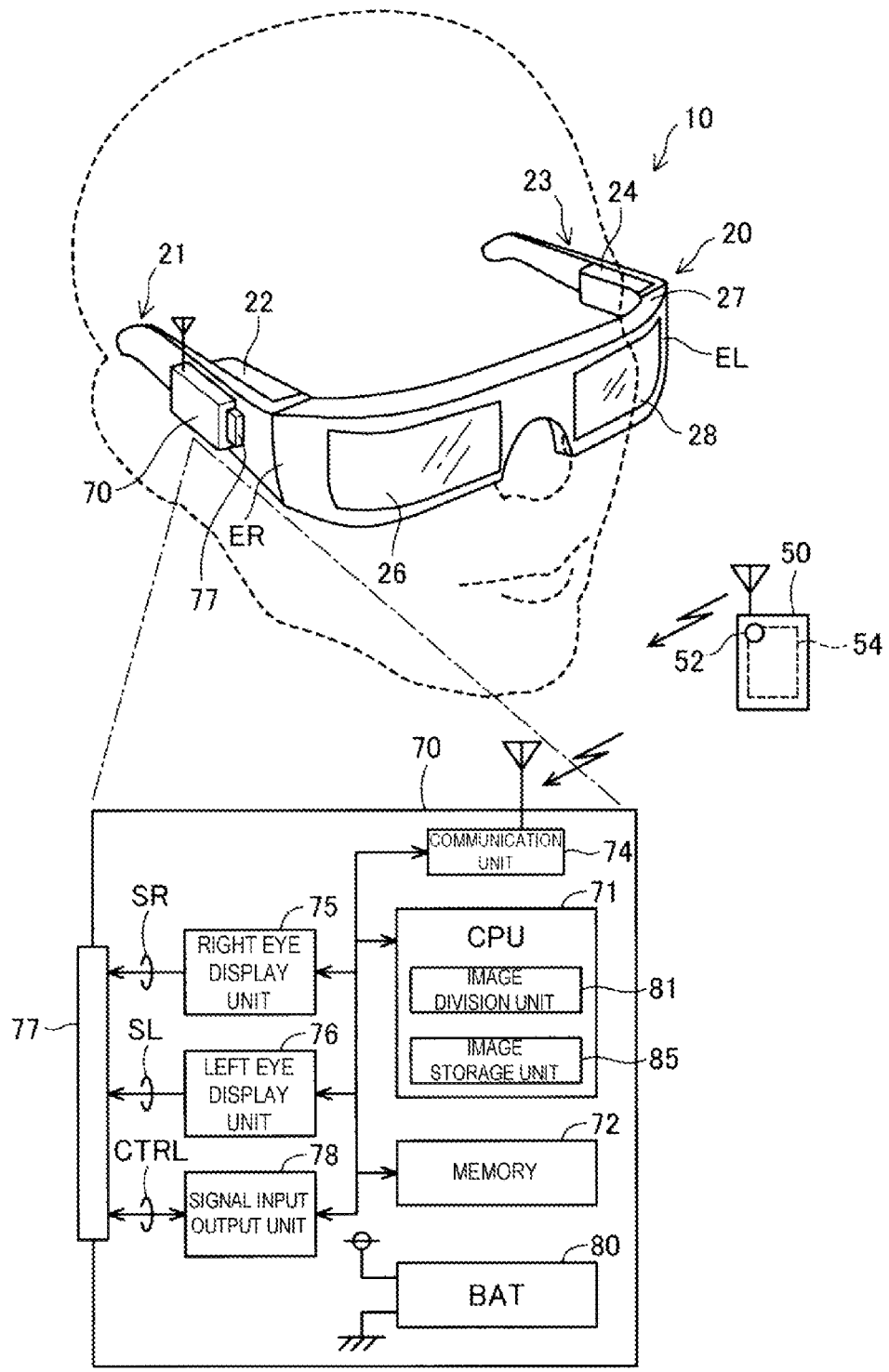
FIG. 1 is a schematic configuration view illustrating a head-mounted display apparatus in which respective display devices according to a first exemplary embodiment for both eyes are incorporated.

A-1. Configuration of Display Device:

FIG. 1 is a schematic configuration diagram of a head-mounted display apparatus (HMD) 20 that includes right and left display devices 22 and 24, that are display devices according to a first exemplary embodiment, for a right eye and a left eye, respectively. The head-mounted display apparatus 20 receives an image transmitted from a terminal device 50, and displays the image to enable binocular view for a user. The head-mounted display apparatus 20 and the terminal device 50 are configured to be able to mutually transmit and receive data through WiFi communication. The terminal device 50 includes a camera 52 and a display panel 54.

The head-mounted display apparatus 20 has an eyeglasses shape and is used by being mounted on a head of the user. The head-mounted display apparatus 20 integrally includes a main body including a right holding part 21, a left holding part 23, and a front frame 27, a right eye display device 22, a left eye display device 24, a right light-guiding plate 26, a left light-guiding plate 28, and a display control unit 70.

The right holding part 21 and the left holding part 23 respectively extend rearward from both ends of the front frame 27 to hold the head-mounted display apparatus 20 on the user's head in a manner similar to temples of a pair of eyeglasses. Here, of both the ends of the front frame 27, in a state where the user wears the head-mounted display apparatus 20, an end located on a right side of the user is referred to as an end ER, and an end located on a left side of the user is referred to as an end EL. The right holding part 21 is provided to extend from the end ER of the front frame 27 to a position corresponding to a right side head part of the user when the user wears the head-mounted display apparatus 20. The left holding part 23 is provided to extend from the end EL of the front frame 27 to a position corresponding to a left side head part of the user when the user wears the head-mounted display apparatus 20.

The right light-guiding plate 26 and the left light-guiding plate 28 are provided in the front frame 27. The right light-guiding plate 26 is positioned in front of the right eye of the user, when the user wears the head-mounted display apparatus 20, to allow the right eye to view an image. The left light-guiding plate 28 is positioned in front of the left eye of the user, when the user wears the head-mounted display apparatus 20, to allow the left eye to view an image.

The front frame 27 has a shape connecting an end of the right light-guiding plate 26 and an end of the left light-guiding plate 28 with each other. This coupling position corresponds to a so-called position of a bridge of the eyeglasses-shaped head-mounted display apparatus 20. The front frame 27 may include a nose pad portion that is provided at the position of connection between the right light-guiding plate 26 and the left light-guiding plate 28, and that is in contact with a nose of the user when the user wears the head-mounted display apparatus 20. In this case, the nose pad portion, the right holding part 21, and the left holding part 23 allow the head-mounted display apparatus 20 to be held on the head of the user. A belt may also be attached to the right holding part 21 and the left holding part 23 that fits to the back of the head of the user when the user wears the head-mounted display apparatus 20. In this case, the belt allows the head-mounted display apparatus 20 to be firmly held on the head of the user.

The right eye display device 22 displays an image by the right light-guiding plate 26. The right eye display device 22 is provided on the right holding part 21 and lies adjacent to the right side head part of the user when the user wears the head-mounted display apparatus 20. The left eye display device 24 displays an image by the left light-guiding plate 28. The left eye display device 24 is provided on the left holding part 23 and lies adjacent to the left side head part of the user when the user wears the head-mounted display apparatus 20.

The right light-guiding plate 26 and the left light-guiding plate 28 according to the exemplary embodiment are optical parts (e.g., prisms or holograms) formed of a light transmission-type resin or the like, and guide imaging light outputted by the right eye display device 22 and the left eye display device 24 to the eyes of the user. Surfaces of the right light-guiding plate 26 and the left light-guiding plate 28 may be provided with dimmer plates. The dimmer plates are thin-plate optical elements having a different transmittance for a different wavelength range of light, and function as so-called wavelength filters. The dimmer plates are arranged to cover a surface of the front frame 27 (a surface opposite to a surface facing the eyes of the user), for example. Appropriate selection of optical properties of the dimmer plates allows the transmittance of light to a desired wavelength range, such as visible light, infrared light, and ultraviolet light to be adjusted, and allows the amount of outside light entering the right light-guiding plate 26 and the left light-guiding plate 28 and passing through the right light-guiding plate 26 and the left light-guiding plate 28 to be adjusted.

The head-mounted display apparatus 20 guides imaging light generated by the right eye display device 22 to the right light-guiding plate 26 and guides imaging light generated by the left eye display device 24 to the left light-guiding plate 28, and uses this imaging light to cause the user to visually recognize a virtual image (this is also referred to as "display an image"). When outside light traveling from a front of the user passes through the right light-guiding plate 26 and the left light-guiding plate 28 and enters the eyes of the user, the imaging light forming the virtual image and the outside light enter the eyes of the user.

As illustrated in FIG. 1, the display control unit 70 includes, in addition to a CPU 71, a memory 72, and a communication unit 74 that are known, a right eye display unit 75, a left eye display unit 76, a signal input-output unit 78, and the like. The display control unit 70 also includes a battery (BAT) for supplying power for an entirety of the head-mounted display apparatus 20. The communication unit 74 exchanges data with the terminal device 50 by WiFi. For the communication by the terminal device 50, a communication network using BlueTooth (registered trademark), 4G, or 5G, instead of WiFi may be used. The CPU 71 is capable of acquiring data of an image to display, and information necessary for display of an image, from the terminal device 50, via the communication unit 74.

In the display control unit 70, a predetermined OS is incorporated, and the CPU 71 executes a program stored in the memory 72 under supervision of the OS to realize various functions including the communication described above. An example of the functions realized is illustrated in FIG. 1 as an image division unit 81, an image storage unit 85, and the like, within the CPU 71. The image division unit 81 divides an image received by the communication unit 74 from the terminal device 50, into a right eye image and a left eye image for binocular view. The image storage unit 85 temporarily stores the image received from the terminal device 50.

The right eye display unit 75 outputs an image signal SR that the right eye display device 22 causes the right eye of the user to visually recognize, via the right light-guiding plate 26. Similarly, the left eye display unit 76 outputs an image signal SL that the left eye display device 24 causes the left eye of the user to visually recognize, via the left light-guiding plate 28. The CPU 71 calculates a position of an image that the user is caused to recognize, computes a parallax of both the eyes so that a virtual image is visible at the position, and outputs right and left images with the parallax to the right eye display device 22 and the left eye display device 24 via the right eye display unit 75 and the left eye display unit 76, respectively.

The signal input-output unit 78 exchanges various signals CTRL required for operation of the head-mounted display apparatus 20 including power from a battery 80 with the right eye display device 22 and the left eye display device 24. The signal CTRL from the signal input-output unit 78 is outputted to the right eye display device 22 and the left eye display device 24 via a conductive connector 77, together with the image signals SR, and SL outputted by the right eye display unit 75 and the left eye display unit 76, respectively.

Figure 2:
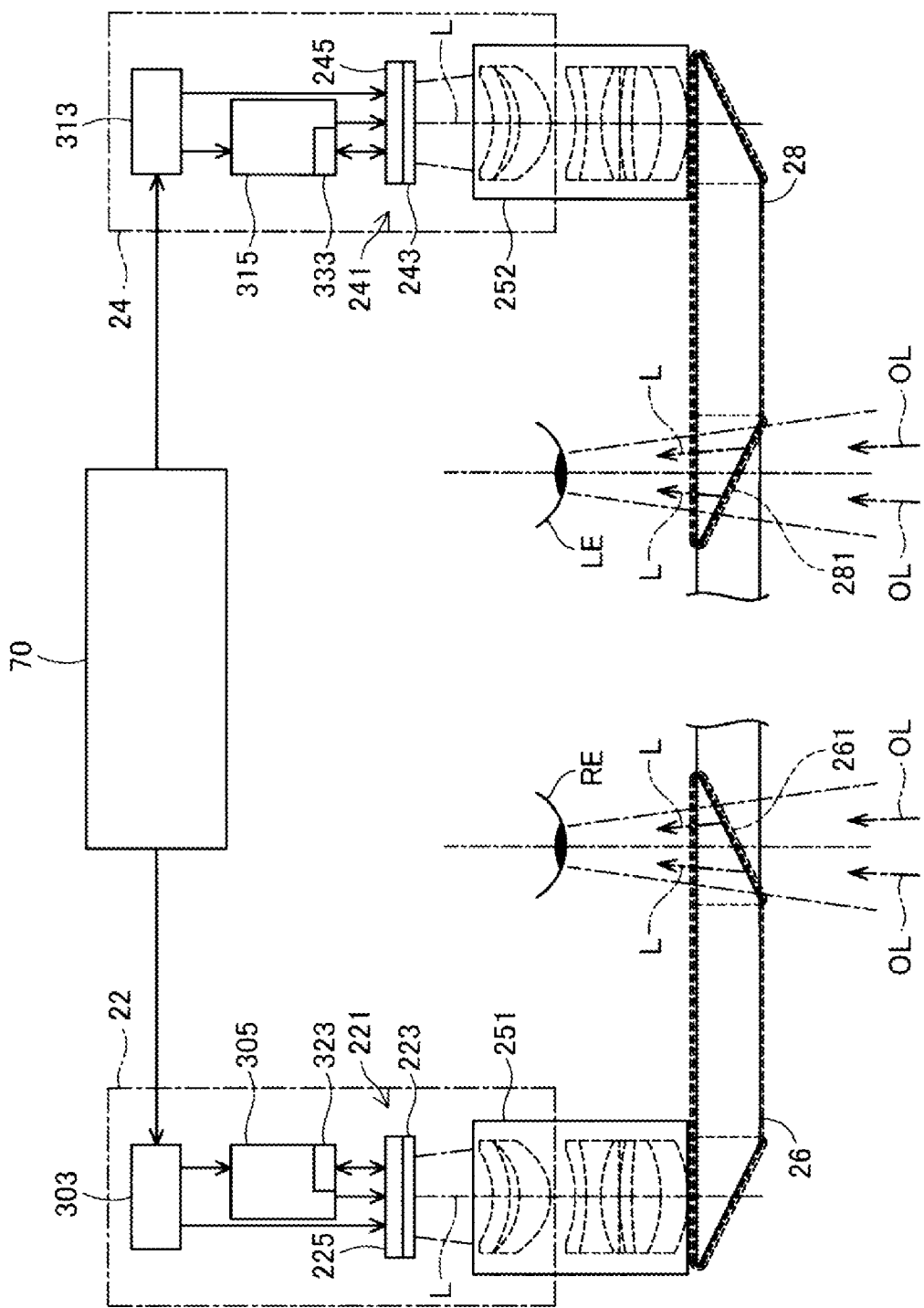
FIG. 2 is a main part plan view illustrating a configuration of an optical system included in the head-mounted display apparatus.

An optical configuration will be described in which the right eye display device 22 and the left eye display device 24 are used for causing the user to recognize an image. FIG. 2 is a main part plan view illustrating a configuration of an optical system included in the head-mounted display apparatus 20. For convenience of description, FIG. 2 illustrates a right eye RE and a left eye LE of the user. As illustrated in FIG. 2, the right eye display device 22 and the left eye display device 24 are configured to be left-right symmetric.

As a configuration for causing the right eye RE to visually recognize a virtual image, the right eye display device 22 as the right eye display unit includes an organic light emitting diode (OLED) unit 221, a right optical system 251, a control circuit 303, and an illuminance adjustment unit 305 having a memory 323 built-in. The OLED unit 221 is configured to emit imaging light. The right optical system 251 includes a lens group and the like and is configured to guide, to the right light-guiding plate 26, imaging light L emitted by the OLED unit 221.

The OLED unit 221 includes an OLED panel 223 and an OLED driving circuit 225 configured to drive the OLED panel 223. The OLED panel 223 is a light emission type display panel including light-emitting elements configured to emit red (R) color light, green (G) color light, and blue (B) color light, respectively, by organic electro-luminescence. The OLED panel 223 includes a plurality of pixels arranged in a matrix, each of the plurality of pixels including one element of R, one element of G, and one element of B. The OLED panel 223 may be configured to include light-emitting elements, arranged in a matrix, that emit white color light, and color filters, disposed over the light-emitting elements, that correspond to the R color, the G color, and the B color, respectively. The OLED panel 223 may have a WRGB configuration including light-emitting elements configured to emit white (W) color light, in addition to light-emitting elements configured to emit R color light, G color light, and B color light, respectively.

The OLED driving circuit 225, according to a signal transmitted from the right eye display unit 75 of the display control unit 70, selects and energizes the light-emitting elements included in the OLED panel 223 to cause the light-emitting elements to emit light. The OLED driving circuit 225 is secured by bonding or the like, for example, onto a rear face of the OLED panel 223, i.e., back of a light-emitting surface. The OLED driving circuit 225 may include, for example, a semiconductor device configured to drive the OLED panel 223, and may be mounted onto a substrate secured to the rear face of the OLED panel 223. Details of the OLED driving circuit 225 will be described later in conjunction with the control circuit 303 and the illuminance adjustment unit 305.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L reflected by the half mirror 261 is emitted from the right light-guiding plate 26 to the right eye RE. The image light L forms an image on the retina of the right eye RE to allow the user to view a virtual image.

As a configuration for causing the left eye LE to visually recognize the virtual image, the left eye display device 24 as the left eye display unit includes an OLED unit 241, a left optical system 252, a control circuit 313, and an illuminance adjustment unit 315 having a memory 333 built-in. The OLED unit 241 is configured to emit imaging light. The left optical system 252 includes a lens group and the like, and is configured to guide, to the left light-guiding plate 28, imaging light L emitted by the OLED unit 241. The OLED unit 241 includes an OLED panel 243 and an OLED driving circuit 245 configured to drive the OLED panel 243. For further details, the OLED unit 241, the OLED panel 243, and the OLED drive circuit 245 are the same as the OLED unit 221, the OLED panel 223, and the OLED driving circuit 225, respectively. For further details, the left optical system 252 is the same as the right optical system 251. The control circuit 313 for the left eye and the illuminance adjustment unit 315 including the memory 333 are identical to the control circuit 303 for the right eye and the illuminance adjustment unit 305, respectively.

According to the configuration described above, the head-mounted display apparatus 20 may function as a see-through display device. That is, the imaging light L reflected by the half mirror 261 and outside light OL passing through the right light-guiding plate 26 enter the right eye RE of the user. The imaging light L reflected by a half mirror 281 and the outside light OL passing through the left light-guiding plate 28 enter the left eye LE of the user. In this manner, the head-mounted display apparatus 20 allows the imaging light L of an internally processed image and the outside light OL to enter the eyes of the user in an overlapped manner. As a result, the user views an external scene (real world) through the right light-guiding plate 26 and the left light-guiding plate 28 and also views a virtual image formed by the imaging light L overlapping the outside scene. In other words, the head-mounted display apparatus 20 transmits the external scene to cause the user to visually recognize the external scene with the virtual image added.

Note that, the half mirror 261 reflects imaging light outputted by the right eye display device 22, and extracts an image, and the half mirror 281 reflects imaging light outputted by the left eye display device 24, and extracts an image. Further, the right optical system 251 and the right light-guiding plate 26 are also collectively referred to as a "right light-guiding unit" and the left optical system 252 and the left light-guiding plate 28 are also collectively referred to as a "left light-guiding unit". Configurations of the right light-guiding unit and the left light-guiding unit are not limited to the example described above, and any desired configuration may be adopted as long as imaging light forms a virtual image in front of the eyes of the user. For example, diffraction gratings or translucent reflective films may be used for the right light-guiding unit and the left light-guiding unit.

Figure 3A:
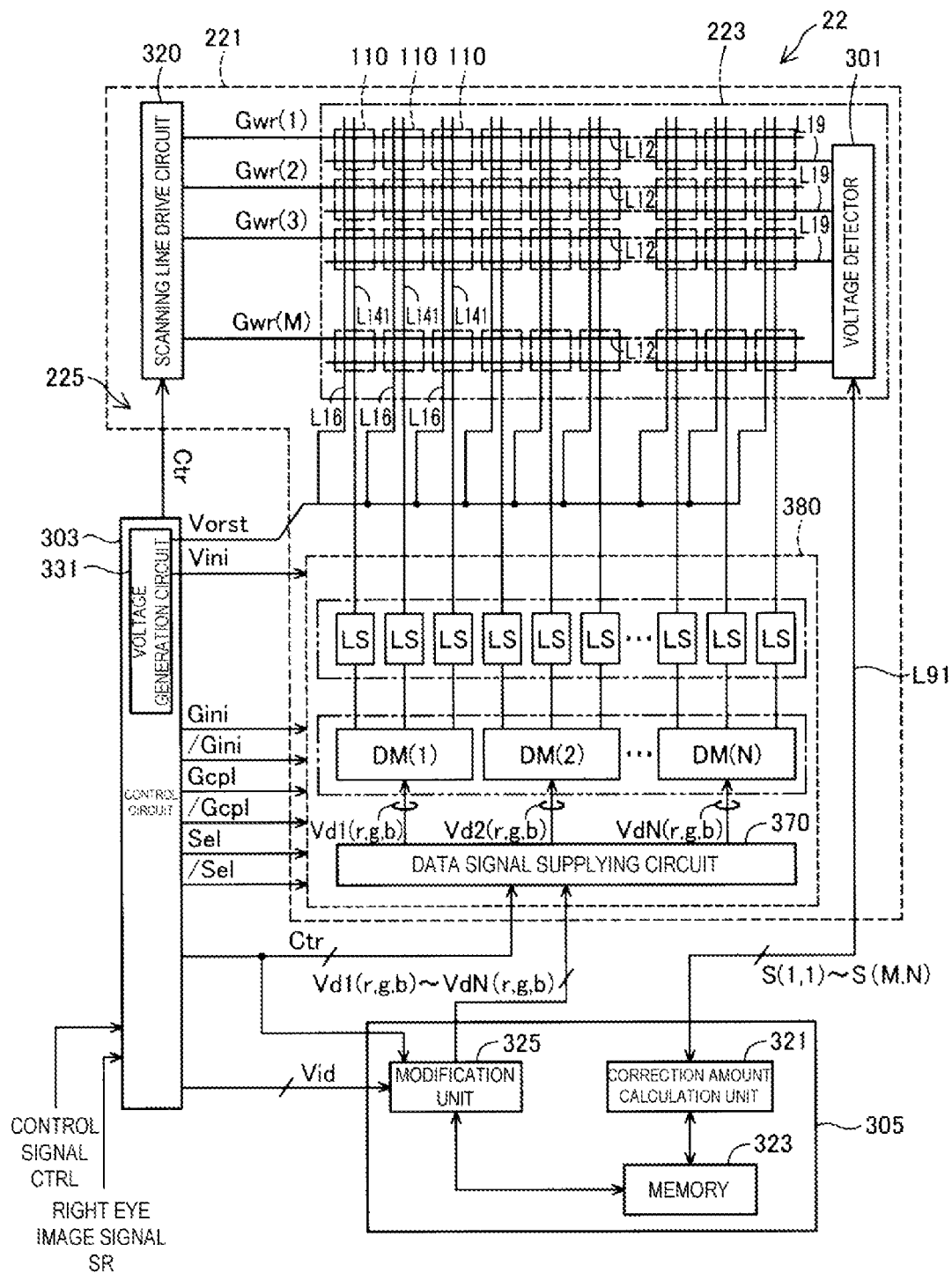
FIG. 3A is a block diagram illustrating a configuration of the display device.

A-2. Circuit Configuration of Display Device:

FIG. 3A is a block diagram illustrating an electrical configuration of the right eye display device 22 according to the present exemplary embodiment. As described above, the right eye display device 22 includes the OLED unit 221, the control circuit 303, and the illuminance adjustment unit 305. The OLED unit 221 includes the OLED driving circuit 225 that drives the OLED panel 223 in cooperation with the control circuit 303 and the illuminance adjustment unit 305. This OLED driving circuit 225 includes a scanning line drive circuit 320, and a data line drive circuit 380. Note that, the left eye display device 24 also includes an identical configuration and operates identically, and thus descriptions thereof will be omitted.

First, a configuration on a side of the OLED panel 223 will be described briefly. As illustrated in an upper stage of FIG. 3A, the OLED panel 223 includes pixel circuits 110 in M rows and in 3·N columns, and a single voltage detector

Figure 3B:
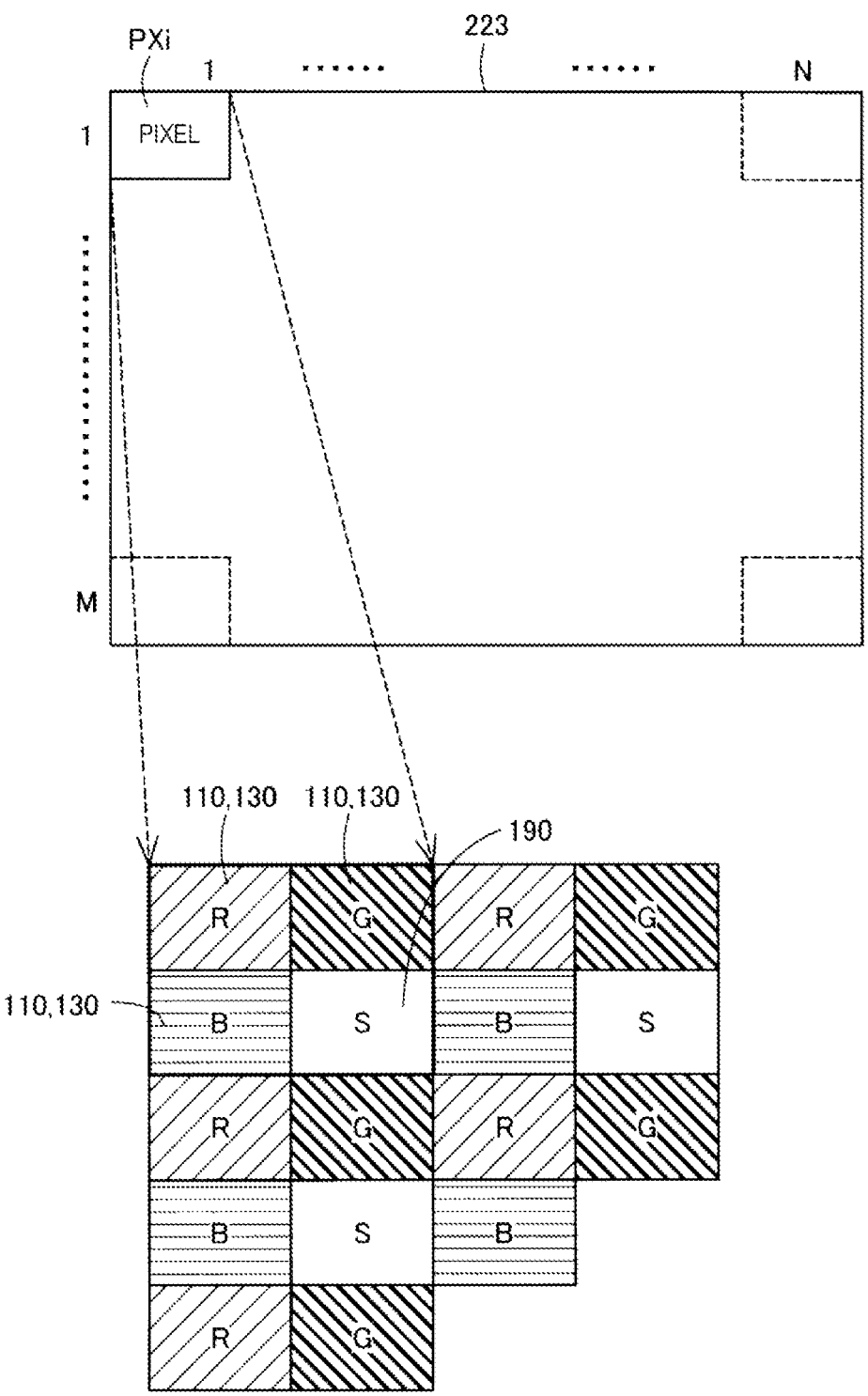
FIG. 3B is an explanatory diagram illustrating a state of arrangement of light-emitting elements and a sensor constituting a pixel in a display unit.

301. In FIG. 3A, three number of the pixel circuits 110 form a set in a horizontally direction, and a light-emitting element 130 for emitting light having a wavelength corresponding to each of RGB, that are three primary colors, is provided in each pixel circuit 110. Arrangement of the light-emitting elements in the OLED panel 223 is illustrated in FIG. 3B. As illustrated, the three pixel circuits 110 horizontally arranged and one illuminance sensor 190 are arranged in 2×2 rectangles in FIG. 3A. The three pixel circuits 110 form a minimum unit, since light beams having respective wavelengths of RGB emitted by the light-emitting elements 130 provided therein are synthesized to represent a specific hue, and this region of 2×2 is referred to here as a pixel PX. Then, in the OLED panel 223, M number of the pixels PX in a vertical direction, and N number of the pixels PX in the horizontal direction are arranged. The one illuminance sensor 190 is provided in each pixel PX, and detects illuminance of the light-emitting element 130 of each pixel circuit 110. A configuration and a function of this illuminance sensor 190 will be described later.

M number of scanning lines L12 outputted from the scanning line drive circuit 320 and 3N number of first data transfer lines L141 and power supplying lines L16 outputted from the data line drive circuit 380 are coupled to the respective pixel circuits 110 arranged in M rows and in 3N columns. A detection signal line L19 from the voltage detector 301 is also coupled to each pixel circuit 110. Scanning signals Gwr(1) to Gwr(M) are outputted exclusively from the scanning line drive circuit 320 to the M scanning lines L12, respectively. On the other hand, similarly, a shift signal is outputted exclusively from the data line drive circuit 380 to the 3N first data transfer lines L141. The shift signal is a drive voltage signal corresponding to luminescent brightness of each light-emitting element 130. Thus, the pixel circuits 110 in the M rows and in the 3N columns and the built-in light-emitting elements 130 are lit in a time-division manner, at luminescent brightness specified by the drive voltage signal.

The shift signal outputted to the first data transfer line L141 is a signal outputted from a level shift circuit LS in the data line drive circuit 380. The data line drive circuit 380 includes 3N number of the level shift circuits LS, N number of demultiplexers DM at a previous stage thereof, and a data signal supplying circuit 370 at a previous stage thereof. When receiving drive voltage signals Vd1(r, g, b) to VdN(r, g, b) that the illuminance adjustment unit 305 outputs in a time-series manner, the data signal supplying circuit 370 separates these drive voltage signals and outputs to a first demultiplexer DM(1), a second demultiplexer DM(2), . . . , and an N-th demultiplexer DM(N), respectively. Each of the demultiplexers DM(1) to DM(N) separates this into respective signals for RGB and outputs to the level shift circuits LS at a subsequent stage. The demultiplexers may be represented as a DM(j).

Since the demultiplexer DM (j), the level shift circuit LS, or the like of the data line drive circuit 380 operates using a signal outputted by the control circuit 303, and thus the signal outputted by the control circuit 303 will be briefly described below.

The control circuit 303 of the right eye display device 22 operates by receiving the image signal SR and the control signal CTRL that are outputted from the display control unit 70 and are digital. The image signal SR is serial data defining a gray scale level of a pixel of an image to be displayed on the OLED panel 223 by, for example, eight bits. Further, the control signal CTRL includes a signal specifying a display position (address) of the image signal SR, that is serial data. The display position may be a signal that directly specifies a position of the light-emitting element 130 arranged on the OLED panel 223, or may be a combination of a signal specifying a scanning line (row) number and a signal specifying a column number from an origin (upper left) of the OLED panel 223, a combination of a synchronization signal identifying a scanning line (row) number and a synchronization signal identifying a number within each scan line, or the like. The control signal CTRL may include, as necessary, a signal sent to the display control unit 70 from a side of the right eye display device 22, for example, an error signal or an illuminance signal measured by an illuminance sensor described below.

The control circuit 303 of the OLED driving circuit 225, based on the control signal CTRL, generates various control signals for driving the OLED panel 223, and supplies the control signals to the OLED panel 223. Specifically, to the OLED panel 223, the OLED driving circuit 225 supplies a control signal ctr, a positive logic control signal Gini, a negative logic control signal/Gini having a logical inversion relationship with the control signal Gini, a positive logic control signal Gcpl, a negative logic control signal/Gcpl having a logical inversion relationship with the control signal Gcpl, control signals Sel(1), Sel(2) and Sel(3), and control signals /Sel(1), /Sel(2) and/Sel(3) having logical inversion relationships with the control signals Sel(1), Sel(2) and Sel(3), respectively. Here, the control signal ctr is a signal including a plurality of signals such as a pulse signal, a clock signal, and an enable signal. Note that the control signals Sel(1), Sel(2), and Sel(3) are generally referred to as a control signal Sel, and the control signals /Sel(1), /Sel(2), and/Sel(3) obtained by logical inversion for the control signals Sel(1), Sel(2), and Sel(3) are generally referred to as a control signal/Sel in some cases.

The control circuit 303 includes a voltage generation circuit 331. The voltage generation circuit 331 supplies various types of potential to the OLED panel 223. Specifically, the voltage generation circuit 331 supplies reset potential Vorst and initial potential Vini and the like to the OLED panel 223.

Further, the control circuit 303 generates an analog image signal Vid, based on the image signal SR. In accordance with the image signal SR, the control circuit 303 generates the image signal Vid indicating brightness potential of the light-emitting element 130 driven by the image signal SR, and outputs the image signal Vid to the illuminance adjustment unit 305. The illuminance adjustment unit 305 includes a correction amount calculation unit 321, the memory 323, and a modification unit 325 therein. The correction amount calculation unit 321 uses a signal from the illuminance sensor 190 described below to calculate a correction amount based on a change in illuminance of each light-emitting elements 130, and stores the correction amounts in the memory 323 as a lookup table. When receiving the image signal Vid from the control circuit 303, the modification unit 325 uses the control signal ctr to refer to the lookup table stored in the memory 323 by a position of the light-emitting element 130 corresponding to the image signal Vid, corrects the image signal Vid, and outputs a drive voltage signal Vd actually outputted to the light-emitting element 130.

The fact has already been described that this drive voltage signal Vd is actually a signal in which three signals corresponding to the respective three primary colors RGB form a set, and the drive voltage signal Vd includes drive voltage signals Vd1(r, g, b) to VdN(r, g, b) corresponding to the N pixels PX provided on the OLED panel 223 in a time series manner. This drive voltage signal Vdj(r, g, b) is outputted to the data signal supplying circuit 370, processed by the demultiplexer DM(j) and the level shift circuit LS described above, and outputted to the first data transfer line L141.

Figure 4:
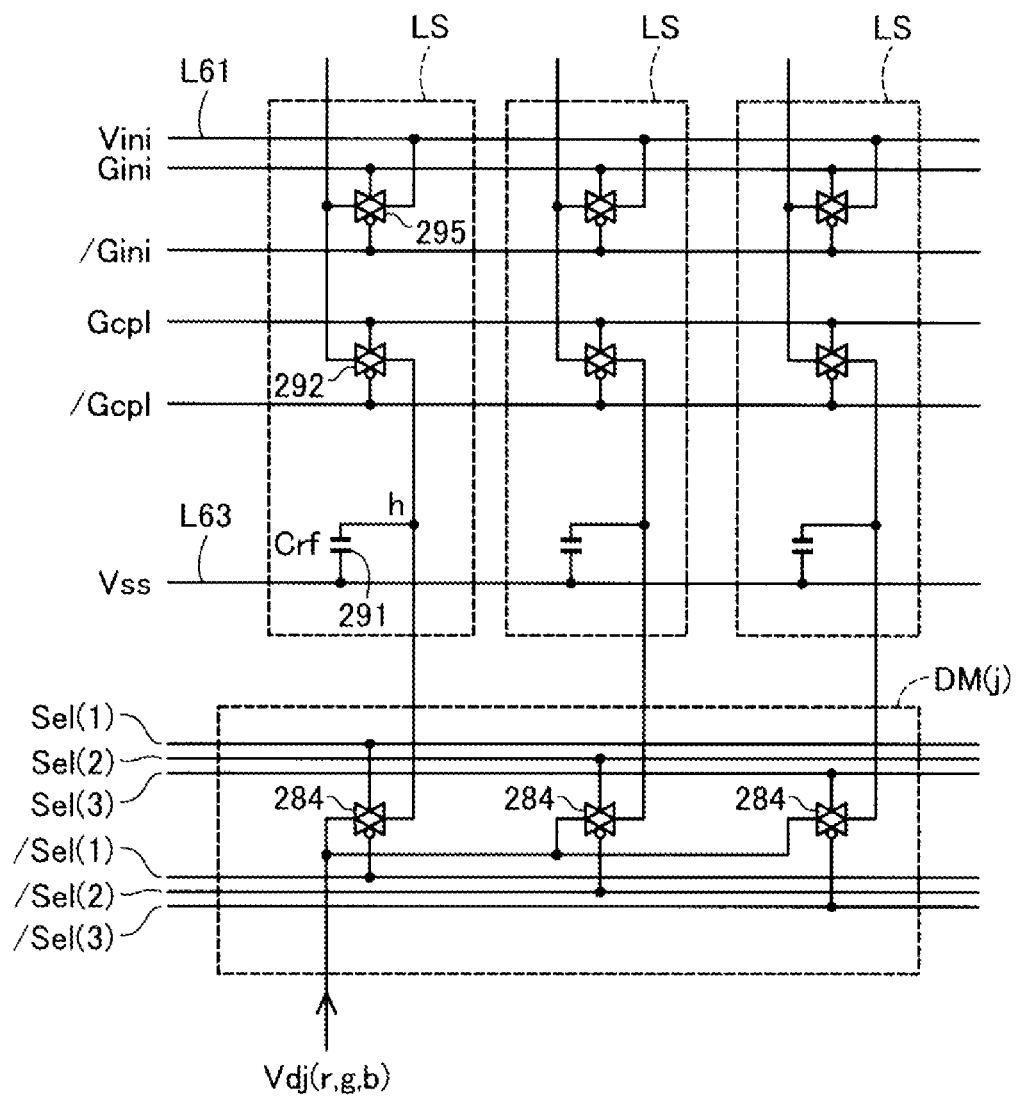
FIG. 4 is a circuit diagram for explaining a configuration of a demultiplexer and a level shift circuit of the display device.

A circuit configuration of the demultiplexer DM(j) and the level shift circuit LS is illustrated in FIG. 4. FIG. 4 representatively represents the demultiplexer DM(j) belonging to a j-th group and three number of the level shift circuits LS coupled to the demultiplexer DM(j).

As illustrated in FIG. 4, the demultiplexer DM(j) is an aggregate of transmission gates 284 provided for respective columns, and supplies drive voltage signal Vdj(r, g, b) in order to three columns constituting each group. Here, respective input ends of the transmission gates 284 corresponding to (3j-2), (3j-1), and 3(j) columns belonging to the j-th group are mutually coupled in common and the drive voltage signal Vdj(r, g, b) is supplied to each common terminal. The transmission gate 284 provided in (3j-2) column being a left end column in the j-th group in the figure is turned on, that is, conducted, when the control signal Sel(1) is at an H level, and when the control signal/Sel(1) is at an L level. Similarly, the transmission gate 284 provided in (3j-1) column in the j-th group is turned on when the control signal Sel(2) is at the H level and when the control signal/Sel(2) is at the L level), and the transmission gate 284 provided in (3j) column is turned on when the control signal Sel(3) is at the H level and when the control signal/Sel(3) is at the L level. In this way, the demultiplexer DM (j) separates the drive voltage signal Vdj(r, g, b) into the drive voltage signals Vd corresponding to RGB respectively.

The level shift circuit LS provided at the subsequent stage of the demultiplexer DM(j) has a set of a retention capacitor 291 with a capacity value of Crf, a transmission gate 295, and a transmission gate 292 for each column, and shifts potential of the drive voltage signal Vd of each of RGB outputted from an output end of the transmission gate 284 of each column.

A source or a drain of the transmission gate 295 in each column is electrically coupled to the first data transfer line L141. Further, the control circuit 303 supplies the control signal/Gini to a gate of the transmission gate 295 of each column in common. The transmission gate 295 is configured such that the first data transfer line L141 and a feed line with the initial potential Vini are electrically coupled when the control signal/Gini is at the L level, and electrically uncoupled when the control signal/Gini is at the H level. Note that, a feed line L61 with the initial potential Vini is supplied with the initial potential Vini predetermined from the control circuit 303.

One electrode of the retention capacitor 291 is electrically coupled to an input end of the transmission gate 292 via a node h. Additionally, an output end of the transmission gate 292 is electrically coupled to the first data transfer line L141. The control circuit 303 supplies the control signals Gcpl and the control signals/Gcpl to the transmission gate 292 of each column. Thus, the transmission gates 292 in the respective columns are simultaneously turned on when the control signal Gcpl is at the H level and when the control signal/Gcpl is at the L level. The one electrode of the retention capacitor 291 in each column is also coupled to the output end of the transmission gate 284 via the node h. When the transmission gate 284 is turned on, the drive voltage signal Vdj is supplied to the one electrode of the retention capacitor 291 via the output end of the transmission gate 284.

Another electrode of the retention capacitor 291 in each column is commonly coupled to a power supplying line L63 to which potential Vss as fixed potential is supplied. Here, the potential Vss may be equivalent to the L level of the scanning signal and the control signal, which are logical signals.

Next, the pixel circuit 110 and the like will be described with reference to FIG. 5. To generally indicate the rows in which the pixel circuits 110 are arranged, m represents any integer of 1 or greater and M or less. Also, any consecutive integers not less than 1 and not greater than M, are denoted as m1 and m2, respectively. That is, m is a generalized concept that includes m1 and m2. Since each pixel circuit 110 has the same configuration as the others in electrical terms, here, description will be given taking the pixel circuit 110 of row m, column (3j-2), positioned in an m-th row and positioned in a (3j-2)-th column being the left end column of the j-th group, as an example.

Each the pixel circuit 110 includes a pixel capacitor 132, a first transistor 121, a second transistor 122, a third transistor 123, a fourth transistor 124, and the light-emitting element 130. Any of the first to fourth transistors 121 to 124 is a p-channel MOS type transistor. The scanning signal Gwr(m), and control signals Gcmp(m), Gel(m), and Gorst (m) are supplied to the pixel circuit 110 in the m-th row. Here, the scanning signal Gwr(m), the control signals Gcmp (m), Gel(m), and Gorst(m) each corresponding to the m-th row are supplied by the scanning line drive circuit 320.

Figure 5:
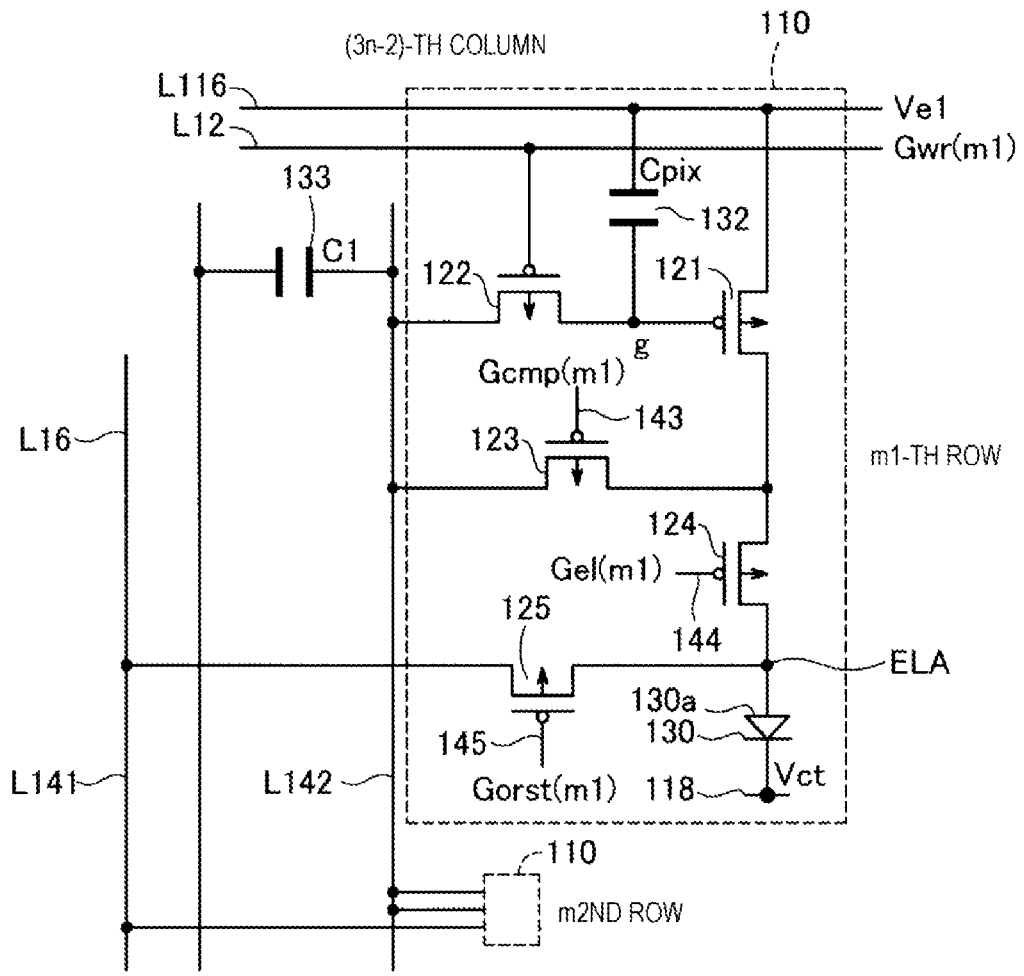
FIG. 5 is a circuit diagram illustrating a configuration of a pixel circuit of the display device.

Although not illustrated in FIG. 2, the OLED panel 223 is provided with, as illustrated in FIG. 5, M number of first control lines 143 extending in a row direction, M number of second control lines 144 extending in a lateral direction, and M number of third control lines 145 extending in the lateral direction. The scanning line drive circuit 320 supplies the control signal Gcmp(m) to the first control line 143 in the m-th row, supplies the control signal Gel(m) to the second control line 144 in the m-th row, and supplies the control signal Gorst(m) to the third control line 145 in the m-th row. In other words, the scanning line drive circuit 320 supplies the scanning signal Gwr(m), the first control signal Gel(m), the second Gcmp(m), and the third Gorst(m), to the pixel circuit positioned in the m-th row, via the scanning line L12, and the first to third control lines 143, 144, and 145 in the m-th column, respectively.

A transfer capacitor 133 is provided outside each pixel circuit 110. The transfer capacitor 133 is coupled in parallel between the first data transfer line L141 and the second data transfer line L142, as illustrated in FIG. 5. Further, the pixel circuit 110 is coupled to the second data transfer line L142. In other words, the pixel circuit 110 is supplied with the drive voltage signal Vdj corresponding to a specified gradation, via the first data transfer line L141 and the second data transfer line L142. In the present exemplary embodiment, it has been described that two number of the pixel circuits 110 share one number of the second data transfer line L142 and one number of the transfer capacitor 133, but the number of pixel circuits 110 (Nb) coupled to one number of the second data transfer line L142 is not limited to two, and may be any number as far as the number is not less than one.

The pixel capacitor 132 has two electrodes. A gate of the second transistor 122 is electrically coupled to the scanning line L12 in the m-th row, and one of a source and a drain of the second transistor 122 is electrically coupled to the second data transfer line L142. Further, another of the source and the drain of the second transistor 122 is electrically coupled to each of a gate of the first transistor 121 and one electrode of the pixel capacitor 132. In other words, the second transistor 122 is coupled between the gate of the first transistor 121 and the transfer capacitor 133. Then, the second transistor 122 functions as a transistor that controls electrical coupling between the gate of the first transistor 121 and the transfer capacitor 133 coupled to the second data transfer line L142 in a (3n-2)-th column.

A source of the first transistor 121 is electrically coupled to a power supplying line L116, and a drain of the first transistor 121 is electrically coupled to one of a source and a drain of the third transistor 123 and a source of the fourth transistor 124. Here, potential Vel that is on a higher side of a power source in the pixel circuit 110 is supplied to the power supplying line L116. The first transistor 121 functions as a drive transistor that flows a current corresponding to a voltage between the gate and the source of the first transistor 121. The third transistor 123 has a gate electrically coupled to the control line 143, and is supplied with the control signal Gcmp(m). This third transistor 123 functions as a switching transistor for controlling electrical coupling between the gate and the drain of the first transistor 121. Thus, the third transistor 123 is a transistor for conducting, via the second transistor 122, between the gate and the drain of the first transistor 121.

The fourth transistor 124 has a gate electrically coupled to the control line 144, and is supplied with the control signal Gel(m). Additionally, a drain of the fourth transistor 124 is electrically coupled to each of a source of the fifth transistor 125 and an anode 130a of the light-emitting element 130. The fourth transistor 124 functions as a switching transistor for controlling electrical coupling between the drain of the first transistor 121 and the anode 130a of the light-emitting element 130. Furthermore, the fourth transistor 124 is coupled between the drain of the first transistor 121 and the anode 130a of the light-emitting element 130. In other words, the drain of the first transistor 121 is electrically coupled to the anode 130a of the light-emitting element 130 via the fourth transistor 124.

The fifth transistor 125 has a gate electrically coupled to the control line 145, and is supplied with the control signal Gorst(m). A drain of the fifth transistor 125 is electrically coupled to the power supplying line L16 in the (3n-2)-th column and maintained at the reset potential Vorst. The fifth transistor 125 functions as a switching transistor for controlling electrical coupling between the power supplying line L16 and the anode 130a of the light-emitting element 130.

The sources and the drains of the respective first to fifth transistors 121 to 125 of the pixel circuit 110 as described above may be reversed in accordance with channel types and potential relationships of the first to fifth transistors 121 to 125. Moreover, each of the transistors may be a thin film transistor or may be a field effect transistor.

The anode 130a of the light-emitting element 130 is a pixel electrode provided individually for each pixel circuit 110. In contrast, a cathode of the light-emitting element 130 is coupled to a common electrode 118 commonly provided across all of the pixel circuits 110. The common electrode 118 is maintained at potential Vct that is on a lower side of the power supply in the pixel circuit 110. The light-emitting element 130 is an element in which an organic EL layer of a predetermined material is interposed between the anode 130a and the cathode having optical transparency, in a silicon substrate. As illustrated in FIG. 3B, the light-emitting element 130 emits light having wavelengths corresponding to respective RGB.

When a current flows from the anode 130a to the cathode in the light-emitting element 130 described above, holes injected from the anode 130a and electrons injected from the cathode are recombined in the organic EL layer to generate excitons and generate light having a wavelength in accordance with a material selected for the organic EL layer. A configuration is adopted in which the light of any of RGB generated at this time is transmitted through the cathode opposite to the silicon substrate (anode 130a), exited outward, and made visible. In the present exemplary embodiment, the material of the organic EL layer used for each light-emitting element 130 is selected in order to make luminescent color be any of RGB, but structure may be adopted in which a luminescent wavelength is changed by changing a film thickness of an intermediate layer using an organic thin film having three-layer structure consisting of an identical molecular system as the organic EL layer. This type of organic EL layer interposes, between an organic thin film layer made of electron-donating (donor) molecules and an organic thin film layer made from electron-accepting (acceptor) molecules, an intermediate layer of an organic thin film made of molecules with excitation energy higher than excitation energy of these organic molecules, and by changing a thickness of the intermediate layer, can set a luminescent color to a predetermined wavelength. Other pixel circuit 110, for example, the pixel circuit 110 in an m2-th row illustrated in FIG. 5, is also provided with a similar configuration and emits light similarly.

The configuration of the OLED panel 223, the circuit configuration of the pixel circuit 110 in the m-th row, and the light-emitting element 130 included in the pixel circuit 110 have been described. When an image is displayed on the OLED panel 223 using the above circuit configuration, from the image signal SR transmitted from the right eye display unit 75 of the display control unit 70, the drive voltage signal Vdj(r, g, b) corresponding to a color to be represented by the pixel PX, is outputted from the illuminance adjustment unit 305 to the data line drive circuit 380, and the respective light-emitting elements 130 of the three pixel circuits 110 located at an intersection point with a row specified by the scanning line drive circuit 320 are caused to emit light at brightness corresponding to the drive voltage signal Vdj(r, g, b).

Figure 6:
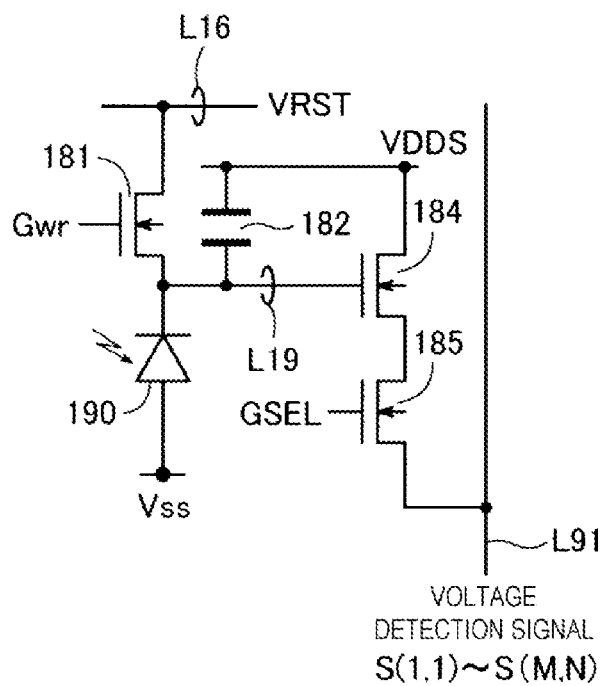
FIG. 6 is a circuit diagram illustrating a circuit configuration of an illuminance sensor.

As illustrated in FIG. 3B, the illuminance sensor 190 is arranged in the pixel PX including the respective pixel circuits 110 corresponding to the respective colors RGB. A circuit configuration of the illuminance sensor 190 is illustrated in FIG. 6. The illuminance sensor 190 is a photodiode and detects intensity of light incident from an outside, or illuminance. The illuminance sensor 190 is coupled in series with a sixth transistor 181, between the power supplying line L16 and the potential Vss, that is the fixed potential of the circuit. Potential of a cathode of the illuminance sensor 190 is retrieved by the detection signal line L19, and retained in a retention capacitor 182, and is retrieved by a detection line L91 via a seventh transistor 184 and an eighth transistor 185 coupled in series.

A gate of the sixth transistor 181 is inputted with the scanning signal Gwr(m) for selecting any of the rows of the OLED panel 223, and a gate of the eighth transistor 185 is inputted with a selection signal GSEL from the level shift circuit LS that selects any three number of the columns (n-2, n-1, n columns) of the OLED panel 223. Accordingly, when three number of the pixel circuits 110 included in one number of the pixel PX are selected, the illuminance sensor 190 outputs a voltage detection signal S corresponding to the detected illuminance to the detection line L91 via the eighth transistor 185. Here, a value of a variable m specifying a scanning line (row) ranges from 1 to M, and a value of n specifying a column ranges from 1 to N, thus illuminance detected by the illuminance sensor 190 is outputted to the illuminance adjustment unit 305, as voltage detection signals from S(1, 1) to S(M, N). One number of the voltage detection signal S(m, n) includes a detection result from the pixel circuit 110 corresponding to the three columns (n-2, n-1, n columns) in a time-division manner. Note that, when the respective light-emitting elements 130 are sequentially lit, measurement can also be performed by activating a plurality of the illuminance sensors 190 included in the respective columns. In this case, it is sufficient that, the gate of the sixth transistor 181 is inputted with, in place of the scanning signal Gwr(m) for selecting a row, a signal GRST indicating timing for lighting each light-emitting element 130. Even when the illuminance sensor 190 is activated, output is not obtained from any of the illuminance sensors 190 other than the illuminance sensor 190 corresponding to one number of the light-emitting element 130 that emits light, and thus illuminance by the light-emitting element 130 that emits light can be measured. In this way, it is sufficient that the signal GRST that is common is inputted to the transistor 181, so the circuit configuration can be simplified.

The circuit including the above-described retention capacitor 182, sixth, seventh, and eighth transistors 181, 184, and 185 is a circuit for detecting a cathode voltage of the illuminance sensor 190, and in FIG. 3A, the circuit is illustrated collectively as the voltage detector 301. Originally, the circuit illustrated in FIG. 6 is required for each illuminance sensor 190 of each pixel PX, and thus the circuit is fabricated in a vicinity of each illuminance sensor 190 using a semiconductor process. This is illustrated in FIG. 7.

Figure 7:
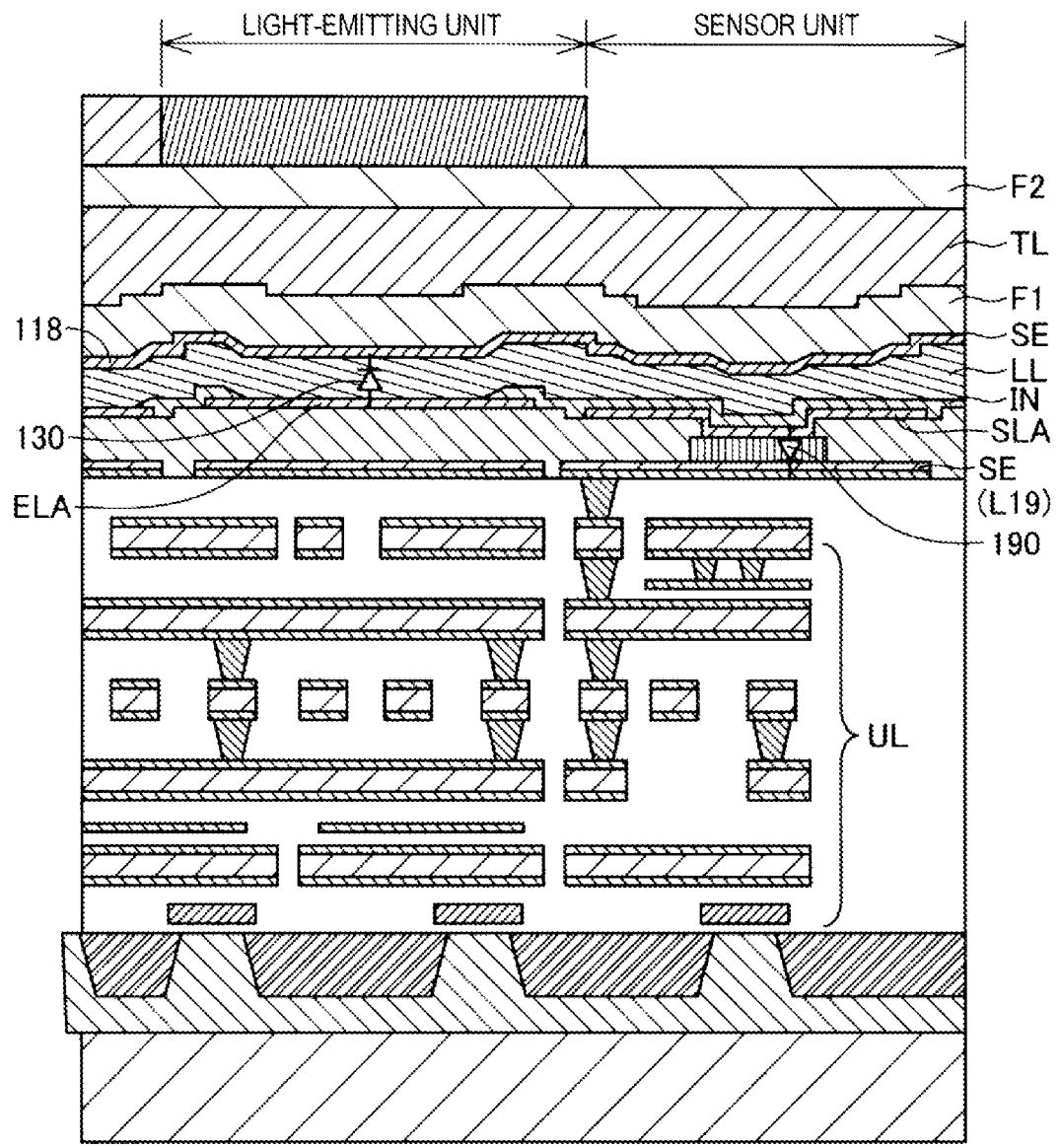
FIG. 7 is an explanatory diagram illustrating structure of a light-emitting unit and a sensor unit.

FIG. 7 is an explanatory diagram illustrating a configuration of one number of the light-emitting element 130 and one number of each illuminance sensor 190 in the pixel PX. In this example, a light-emitting unit including the light-emitting element 130 and a sensor unit including each light illuminance sensor 190 are provided to be adjacent to each other. A filter FT that cuts light having excess wavelengths from light exited is provided in the light-emitting unit. The light-emitting unit and the sensor unit are each formed at an under layer UL in which various electronic circuits are fabricated using a semiconductor process.

In the light-emitting unit, at a layer in which an anode electrode ELA (see FIG. 5) to which an organic EL anode is coupled is formed, a light-emitting layer LL, and the common electrode 118 (see FIG. 5) to which an organic EL cathode is coupled are formed.

On the other hand, the sensor unit is provided with a cathode electrode SE of the detection signal line L19 to which the cathode of the illuminance sensor 190 is coupled, and an anode electrode SLA to which an anode is coupled, and the illuminance sensor 190 is formed between both the electrodes. An insulating layer IN is stacked on the anode electrode SLA, and the light-emitting layer LL for the light-emitting element 130 is formed at the insulating layer IN, and similarly the cathode electrode SE is formed at the light-emitting layer LL. A sealing layer F1, a planarization layer TL, and a sealing layer F2 are further provided on the cathode electrode SE.

Figure 8:
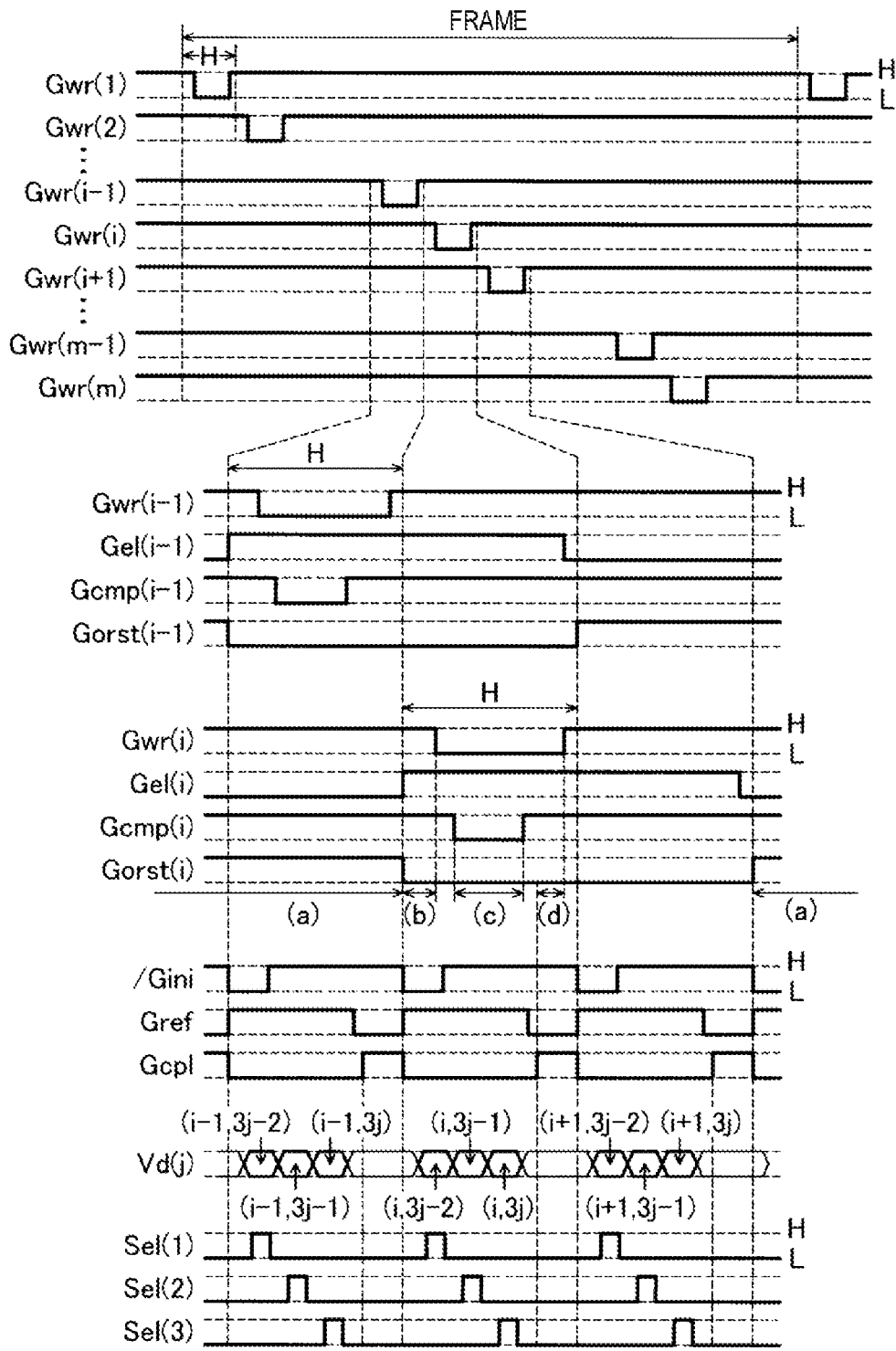
FIG. 8 is a timing chart illustrating operation of the display device.

A-3. Operation of Right Eye Display Device:

Operation of the right eye display device 22 will be described with reference to FIG. 8. FIG. 8 is a timing chart for explaining operation of each unit of the right eye display device 22. As illustrated, the scanning line drive circuit 320 sequentially switches the scanning signals Gwr(1) to Gwr(m) to the L level, and sequentially scans the scanning lines L12 in the first to the M-th row, respectively for each one horizontal scanning period (H) in one frame period. Operation in the one horizontal scanning period (H) is common across the pixel circuits 110 of the respective rows. Here, as for the following, operation will be described, particularly focusing on the pixel circuits 110 of m1 row, (3n-2) column, in a horizontal scanning period in which the m1-th row is horizontally scanned.

In the present exemplary embodiment, the horizontal scanning period for the m1-th row is, when divided broadly, divided into a compensation period denoted as (c), and a writing period denoted as (d) in FIG. 8. Further, periods other than the horizontal scanning period are divided into a light-emission period denoted as (a), and an initialization period denoted as (b). Then, after the writing period of (d), the light-emission period denoted by (a) starts again, and the horizontal scanning period of the m1-th row is again reached after one frame period elapses. Thus, in terms of order of time, a cycle of the light-emission period->the initialization period->the compensation period->the writing period->the light-emission period is repeated.

Hereinafter, for convenience of explanation, description will start with the light-emission period that is a prerequisite of the initialization period. FIG. 8 is a diagram explaining operation of the pixel circuit 110 and the like in the light-emission period. Note that, in FIG. 8, a current path that is important in the operational description is indicated by a thick line, and an "X" symbol is marked with a thick line on a transistor or a transmission gate in an off state.

Light-Emission Period

As illustrated in the timing chart in FIG. 8, in the light-emission period of the m1-th row, a scanning signal Gwr(m1) is at the H level, a control signal Gel(m1) is at the L level, a control signal Gcmp(m1) is at the H level, and a control signal Gfix(k) is at the H level. Thus, as illustrated in FIG. 8, in the pixel circuit 110 of m1 row, (3n-2) column, the fourth transistor 124 is turned on while the transistors 122, 123, 125, and 126 are turned off. Thus, the first transistor 121 supplies a drive current Ids according to a voltage held by the pixel capacitor 132, that is, a voltage Vgs between the gate and the source, to the light-emitting element 130. In other words, the light-emitting element 130 is supplied with a current according to a gradation potential according to a specified gradation of each pixel by the first transistor 121, and emits light at brightness according to the current.

Here, in the level shift circuit LS in the light-emission period, the control signal/Gini is turned to the H level, so the transmission gate 295 is turned off as illustrated in FIG. 8, and the control signal Gcpl is turned to the L level, and thus, the transmission gate 292 is turned off as illustrated in FIG. 8. In addition, in the demultiplexer DM(n) in the light-emission period, the control signal Sel(1) is turned to the L level, so the transmission gate 284 is turned off.

Since the light-emission period of the m1-th row is a period in which a row other than the m1-th row is horizontally scanned, the transmission gate 284, the transmission gate 292, and the transmission gate 295 are turned on or off in accordance with operation of these rows, and thus potential of each of the first data transfer line L141 and the second data transfer line L142 varies as appropriate. However, since the second transistor 122 is off in the pixel circuit 110 in the m1-th row, potential variation in the first data transfer line L141 and the second data transfer line L142 is not considered here.

Initialization Period

Next, the initialization period of the m1-th row starts. As illustrated in FIG. 8, in the initialization period of the m1-th row, the scanning signal Gwr(m1) is at the H level, the control signal Gel(m1) is at the H level, the control signal Gcmp(m1) is at the H level, and the control signal Gfix(k)

is at the L level. Thus, the transistor 125 is turned on in the pixel circuit 110 of m1 row, (3n-2) column, while the transistors 122, 123, and 124 are turned off. Accordingly, a path of a current supplied to the light-emitting element 130 is blocked, so the light-emitting element 130 is brought into an off (non light-emitting) state.

Here, in the level shift circuit LS in the initialization period, the control signal /Gini is turned to the L level, so the transmission gate 295 is turned on, and the control signal Gcpl is turned to the L level, and thus, the transmission gate 292 is turned off. Thus, the first data transfer line L141 coupled to the transfer capacitor 133 is set to the initial potential Vini. In addition, in the demultiplexer DM(n) in the initialization period, the control signal Sel(1) is turned to the H level, so the transmission gate 284 is turned on. Accordingly, gradation potential is written to the retention capacitor 291 having the capacitance value Crf.

Compensation Period

When the initialization period of (b) described above ends, the horizontal scanning period starts. First, the compensation period of (c) illustrated in FIG. 8 starts. In the compensation period of the m1-th row, the scanning signal Gwr(m1) is at the L level, the control signal Gel(m1) is at the H level, the control signal Gcmp(m1) is at the L level, and the control signal Gfix(k) is at the H level. Thus, the transistors 122, 123, and 125 are turned on in the pixel circuit 110 of m1 row, (3n-2) column, while the fourth transistor 124 is turned off. At this time, a gate g of the first transistor 121 is coupled to the drain thereof via the second transistor 122 and the third transistor 123 (diode coupled), and a drain current flows to the first transistor 121 to charge the gate g. In other words, the drain and the gate g of the first transistor 121 are coupled to the second data transfer line L142, and when a threshold voltage of the first transistor 121 is Vth, potential Vg of the gate g of the first transistor 121 is asymptotic to (Vel-Vth).

Here, in the level shift circuit LS in the compensation period, the control signal /Gini is turned to the L level, so the transmission gate 295 is turned on, and the control signal Gcpl is turned to the L level, and thus, the transmission gate 292 is turned off. At this time, since the second data transfer line L142 is shorter compared to the configuration in the past as described above, time required for charging or discharging a parasitic capacitor associated with the second data transfer line L142 is shortened, and the compensation period itself is shortened.

In addition, in the demultiplexer DM(n) in the compensation period, the control signal Sel(1) is turned to the H level, so the transmission gate 284 is turned on. Accordingly, gradation potential is written to the retention capacitor 291 having the capacitance value Crf.

At this time, since the fourth transistor 124 is off, the drain of the first transistor 121 is electrically non-coupled with the light-emitting element 130. Further, similar to the initialization period, turning the fifth transistor 125 on electrically couples the anode 130a of the light-emitting element 130 to the power supplying line 16, and potential of the anode 130a is set to the reset potential Vorst.

Writing Period

In the horizontal scanning period of the m1-th row, when the compensation period of (c) described above ends, the writing period of (d) starts. In the writing period of the m1-th row, the scanning signal Gwr(m1) is at the L level, the control signal Gel(m1) is at the H level, the control signal Gcmp(m1) is at the H level, and the control signal Gfix(k) is at the H level. Thus, the transistors 122 and 125 are turned on in the pixel circuit 110 of m1 row, (3n-2) column, while the transistors 123 and 124 are turned off.

Here, in the level shift circuit LS in the writing period, the control signal /Gini is turned to the H level, so the transmission gate 295 is turned off, and the control signal Gcpl is turned to the H level, and thus, the transmission gate 292 is turned on. Thus, the supply of the initial potential Vini to the first data transfer line L141 and the transfer capacitor 133 is released, and one electrode of the retention capacitor 291 having the capacitance value of Crf is coupled to the first data transfer line L141 and the transfer capacitor 133, and the transfer capacitor 133, or the like, is supplied with gradation potential. Then, a signal for which gradation potential is subjected to level-shift is supplied to the gate of the first transistor 121, and written to a pixel capacitor Cpix. Note that, in the demultiplexer DM(n) in the writing period, the control signal Sel(1) is turned to the L level, so the transmission gate 284 is turned off. At this time, since the fourth transistor 124 is off, similar to the compensation period, the potential of the anode 130a is initialized to the reset potential Vorst.

In the writing period of the m-th row, the OLED driving circuit 225, with respect to an n-th group, switches a data signal Vd(n) in order to potential corresponding to respective gray-scale levels of the pixel circuits 110 in the m-th row and in the (3n-2) column, in the m-th row and in the (3n-1) column, and in the m-th row and in the (3n) column. On the other hand, the OLED driving circuit 225 exclusively sets the control signals Sel(1), Sel(2), and Sel(3) to the H level exclusively in order, in accordance with the switching of potential of the data signal. Although not illustrated, the OLED driving circuit 225 also outputs the control signals /Sel(1), /Sel(2), and /Sel(3) having respective logical inversion relationship to the control signals Sel(1), Sel(2), and Sel(3). Thus, in the demultiplexer DM, the transmission gate 34 is turned on in an order of a left end column, a center column, and a right end column in each group.

Figure 9:
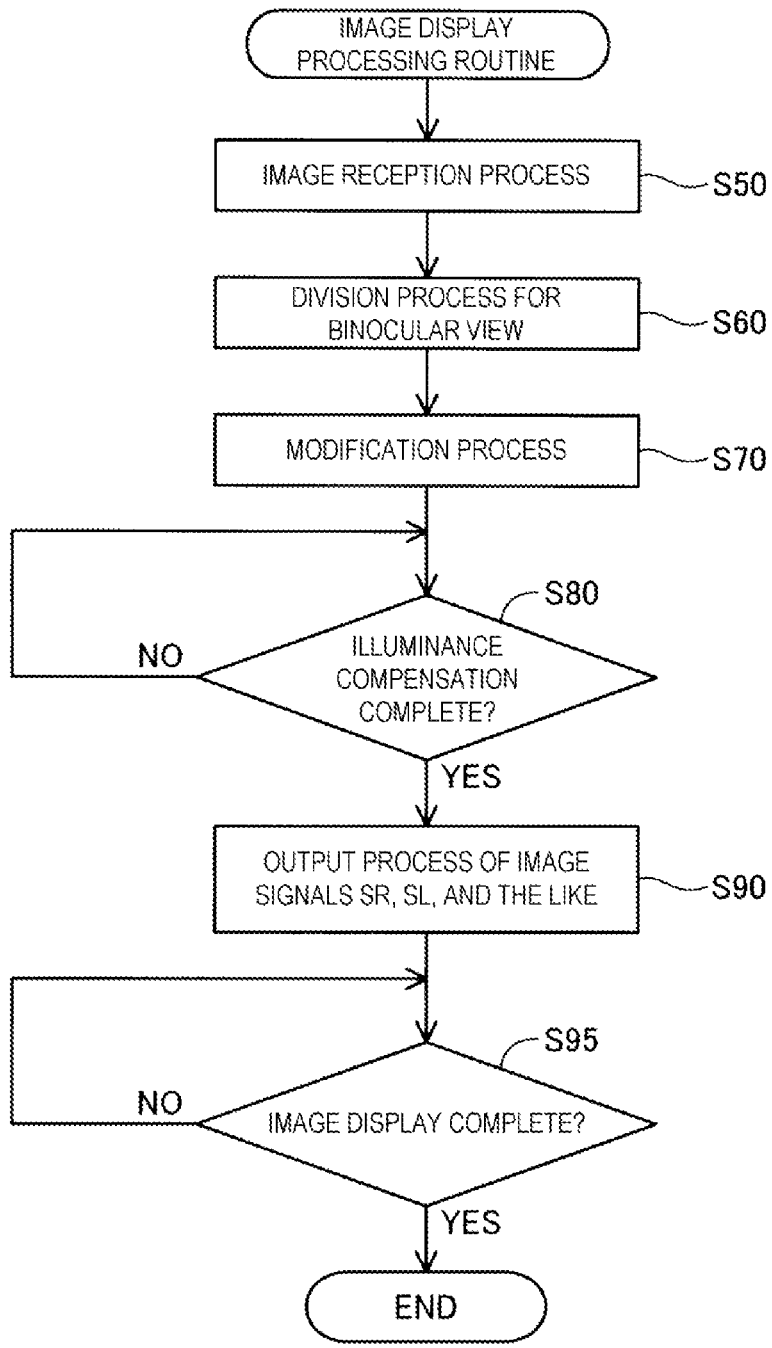
FIG. 9 is a flowchart illustrating an image display processing routine executed by a control unit.

A-4. Image Display Processing:

The circuit configuration and the operation of each unit of the right eye display device 22 employing the OLED panel 223 have been described in detail. The left eye display device 24 also includes an identical configuration to that of the right eye display device 22. Thus, image display using the head-mounted display apparatus 20 will be described below. FIG. 9 is a flowchart illustrating an image display processing routine in the display control unit 70, when an image is displayed using the head-mounted display apparatus 20.

When starting image display, the display control unit 70 first receives, via communication, image data to display from the terminal device 50, and stores this image data in the image storage unit 85 (step S50). Subsequently, a process for dividing the image data once stored for binocular view is performed (step S60). This process corresponds to processing by the image division unit 81. As illustrated in FIG. 1, the head-mounted display apparatus 20 can display virtual images to the right eye and the left eye of the user respectively, thereby causing behavior to be visible in stereoscopic view. For the stereoscopic view, images displayed on the right eye display device 22 and the left eye display device 24 respectively need to be modified according to an eye width, or for generating a parallax. For this reason, after the received image data is divided into right eye image data and left eye image data, a process for modifying the images is performed (step S70).

The display control unit 70 then checks in the right eye display device 22 and the left eye display device 24 whether a process for illuminance compensation is completed or not (step S80), and when the completion of the illuminance compensation process is confirmed, outputs the modified right eye image data and the left eye image data, from the right display unit 75 as the image signal SR for the right eye, and from the left eye display unit 76 as the image signal SL for the left eye respectively, and further outputs the control signal CTRL required for displaying the image signals SR and SL from the signal input-output unit 78, to the right eye display device 22 and the left eye display device 24 (step S90). The output of the image signals SR, SL and the like to the right eye display device 22 and the left eye display device 24 continues until an end of the image display is indicated (step S95).

The right eye display device 22 and the left eye display device 24, after receiving the right and left image signals SR, SL, and the control signal CTRL from the display control unit 70, display images for binocular vision on the OLED panels 223 and 243 respectively, in accordance with the image signals SR, SL and the control signal CTRL. Before the display starts, and when brightness of the light-emitting element 130 changes, the right eye display device 22 and the left eye display device 24 acquire data for compensating this, that is, a change amount of the illuminance, and when the display is actually performed, modify the drive voltage signal Vdj(r, g, b) so as to compensate for this change amount. As described above, the modification is performed in the illuminance adjustment units 305 and 315, by referring to a lookup table created in accordance with a change amount of illuminance acquired in advance. The lookup table is stored in memory 323.

Figure 10:
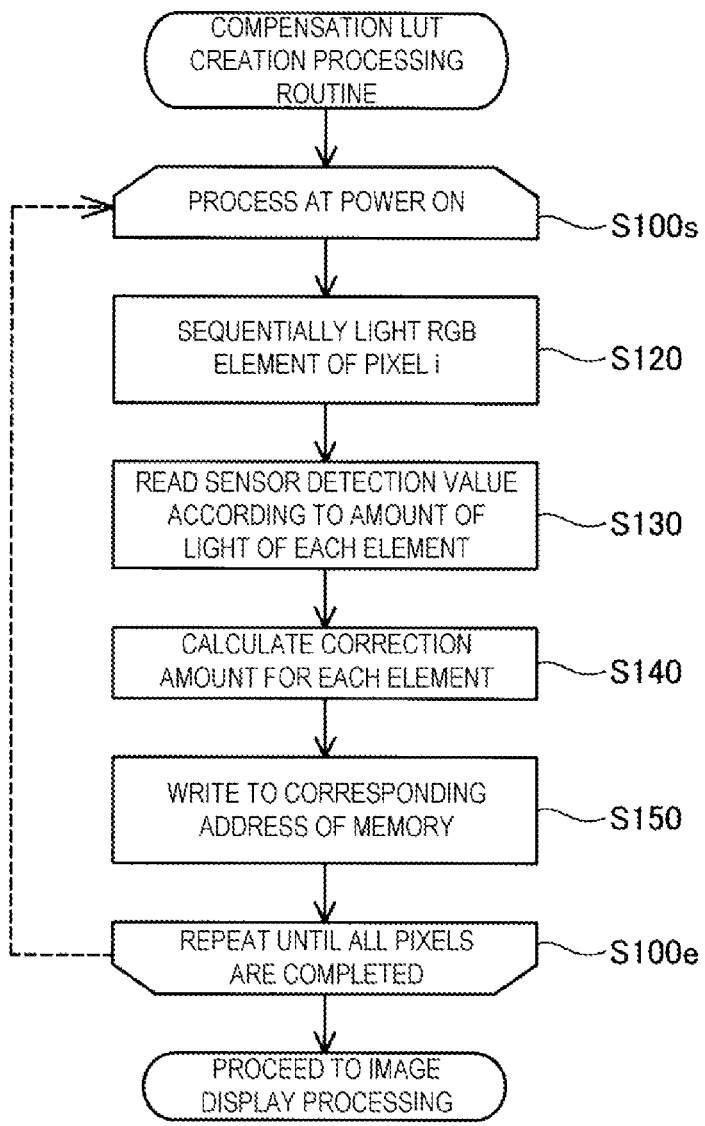
FIG. 10 is a flowchart illustrating a compensation LUT creation processing routine executed by an illuminance adjustment unit.

A process of creating this lookup table (LUT) will be described in detail using FIG. 10. This process is performed in the illuminance adjustment units 305 and 315 illustrated in FIG. 2 and FIG. 3. In the present exemplary embodiment, this compensation LUT creation process is performed when the head-mounted display apparatus 20 is powered on, but may be performed each time before starting image display. Alternatively, the process may be performed each time usage time of the OLED panels 223 and 243 reaches predetermined time set in advance.

When this compensation LUT creation process routine starts when power is on, the following processes are repeated until processing is complete for all the pixels (steps S100s to S100e). First, the light-emitting elements 130 that emit respective colors RGB of a pixel i are sequentially caused to light (step S120). A variable i specifying a pixel is a variable, where i=1 at an upper left of each of the OLED panels 223 and 245, and i=M×N at a lower right. The presence of three number of the pixel circuits 110, and the light-emitting element 130 incorporated into the pixel circuit 110 is as illustrated in FIG. 3B. Thus, the three pixel circuits 110 are sequentially driven, and the light-emitting elements 130 of the respective colors are driven and lit, using the drive voltage signal Vdj(r, g, b) prepared for acquiring a change amount in advance. Note that, in the circuit configuration diagram of the right eye display device 22 illustrated in FIG. 3A, for a variable j used to specify the drive voltage signal Vdj(r, g, b), and the variable i for specifying the pixel PX, the following relation holds: I=m·j: m=1 to M.

In step S130 that follows, the drive voltage signal Vdj(r, g, b) prepared for acquiring a change amount is used to detect illuminance when the light-emitting elements 130 of the respective colors are driven and lit, by the illuminance sensor 190 provided in the pixel PXi. Specifically, a voltage output value of the illuminance sensor 190 when the light-emitting element 130 is lit is acquired. The illuminance obtained from the voltage output value acquired at this time corresponds to luminescent brightness of the light-emitting element 130. There is an individual difference for the luminescent brightness of each light-emitting element 130, and the luminescent brightness normally decreases according to cumulative use time. Thus, by lighting each light-emitting element 130 with the drive voltage signal Vdj(r, g, b) prepared in advance, and reading a detected value by the illuminance sensor 190, it is possible to know how much the brightness of the light-emitting element 130 decreases from standard brightness at start of use.

Thus, next, a correction amount for compensating for this decrease in brightness is calculated for each light-emitting element 130 (step S140). Assume that a rated current of the light-emitting element 130 is, for example, FF milliamperes. Assume that this light-emitting element 130 is used in an output range of 0 to 80%. That is, maximum brightness at start of use (hereinafter referred to as default) is caused to correspond to 0.8×FF milliamperes. Since the present exemplary embodiment tries to maintain white balance at start of use for a duration of use, by balancing the respective colors RGB, maximum currents of the respective light-emitting elements 130 of RGB when default white balance is achieved are defined, using respective rated currents FFr, FFg, FFb of RGB, such that $R: 0.8 \cdot FFr$ $G: 0.8 \cdot FFg$ $B: 0.8 \cdot FFb.$ Assuming that, when use starts in this state, and brightness of the light-emitting elements 130 of the colors at certain time is reduced from brightness of a standard state by $\Delta r$, $\Delta g$, and $\Delta b$ %, respectively, correction amounts $\alpha r$, $\alpha g$, and $\alpha b$ for the light-emitting elements 130 are respectively determined as follows:

$Ar=100/(100-\Delta r)$ $Ag=100/(100-\Delta g)$ $Ab=100/(100-\Delta b).$

This process is realized by the correction amount calculation unit 321.

Thus, the correction amounts $\alpha r$, $\alpha g$, and $\alpha b$ determined as described above are sequentially written to an address of the memories 323 and 333 corresponding to the variable i (step S150). When the above process is repeated until all pixels PX are completed, a lookup table is formed in association with the variable i, in a predetermined address range of each of the memories 323 and 333.

When such a lookup table is stored in the memories 323 and 333, in subsequent image display, when the control circuits 303 and 313 output the analog image signal Vid, the illuminance adjustment units 305 and 315 receive the analog image signal Vid, refer to, of the lookup table stored in the memories 323 and 333, an address corresponding to a pixel position i, acquire the correction amounts $\alpha r$, $\alpha g$, and $\alpha b$, modify the image signal Vid, and output the image signal Vid as the drive voltage signal Vdj (r, g, b).

By performing the process described above, even when the luminescent brightness of the light-emitting element 130 of each color decreases along with usage, the drive voltage signal Vdj(r, g, b) is modified such that an amount of current flowing through the light-emitting element 130 of each color is increased by a decreased amount, thus until the amount of current reaches a rated current, the illuminance of each color can be corrected toward default illuminance, and white balance of an image displayed by the OLED panels 223 and 243 can be maintained.

Figure 11:
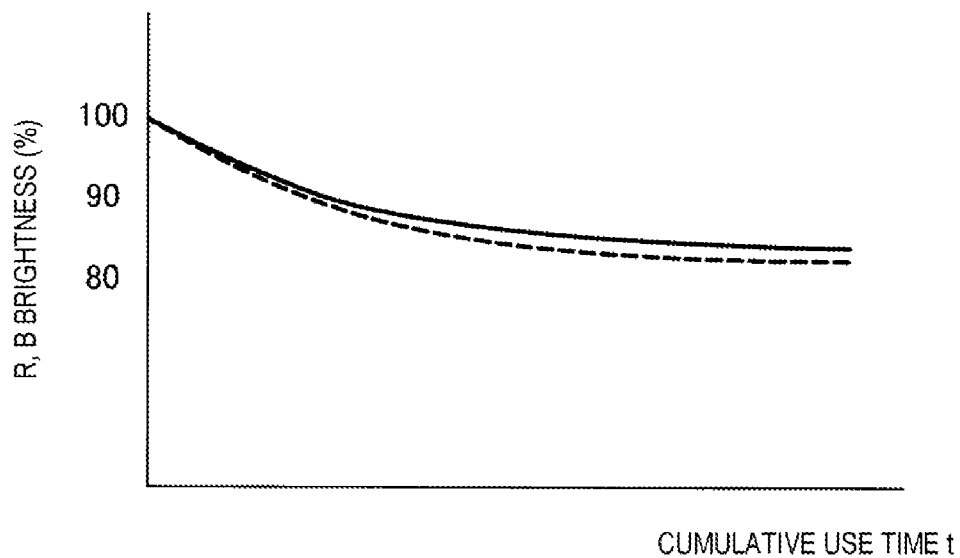
FIG. 11 is a graph illustrating a relationship between cumulative use time and luminescent brightness of the light-emitting elements of R and B.
Figure 12:
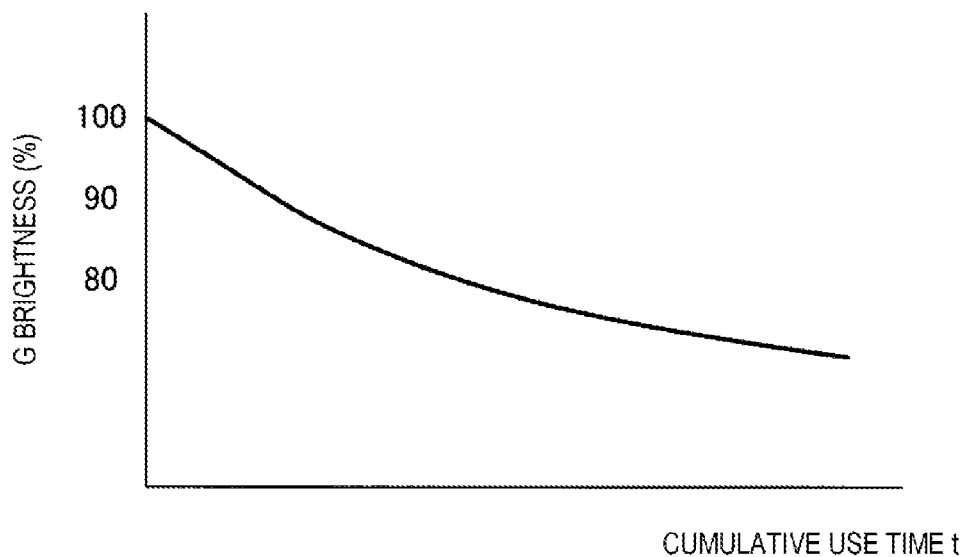
FIG. 12 is a graph illustrating a relationship between cumulative use time and luminescent brightness of the light-emitting element of G.

FIG. 11 is a graph showing how brightness of the light-emitting elements 130 of each of luminescent colors R and B used in the present exemplary embodiment decreases as cumulative use time t increases, with the brightness at the start of use as 100%. Further, FIG. 12 is a graph showing how brightness of the light-emitting elements 130 of luminescent color G used in the present exemplary embodiment decreases as the cumulative use time t increases, with the brightness at the start of use as 100%. Comparing both, it can be seen that the brightness of the light-emitting element 130 of the luminescent color G is more greatly decreased along with the cumulative use time t, than the brightness of the light-emitting element 130 of each of the luminescent colors R and B. However, the difference depends on the structure of the light-emitting element 130 and the organic material used.

In any case, when the brightness of each light-emitting element 130 decreases, a degree of the decrease is detected by the illuminance sensor 190, and a correction amount to compensate for the decrease is written to the lookup table in each of the memories 323 and 333, and thus, when an image is displayed, the amount of decrease in the brightness along with the cumulative usage time t is modified. Similarly, a variation in brightness (individual difference) at start of use of each light-emitting element 130 is also modified. Note that, when white balance at start of use is modified, it is sufficient that coefficients Wr, Wg, and Wb for the respective colors for white balance adjustment are prepared, and respective maximum currents of the light-emitting elements 130 of the colors at the start of use are defined as follows:

$R: 0.8 \cdot FFr \cdot Wr$ $G: 0.8 \cdot FFg \cdot Wg$ $B: 0.8 \cdot FFb \cdot Wb.$ In the present exemplary embodiment, the respective display devices 22 and 24 for the right eye and for the left eye, are incorporated into the head-mounted display apparatus 20. Thus, for each of the two display devices 22 and 24, there is not only a demand to compensate for a change in brightness of the light-emitting element 130 and maintain white balance, but there is also a demand to bring brightness and color of one screen and brightness and color of another screen closer to each other. In this case, it is sufficient that the illuminance adjustment unit 305 for the right eye outputs, via the control circuit 303, voltage detection signals S(1, 1) to S(M, N) that are detection results of the illuminance sensor 190 in the OLED panel 223 to the display control unit 70, the illuminance adjustment unit 315 for the left eye outputs, via the control circuit 313, the voltage detection signals S(1, 1) to S(M, N) that are the detection results of the illuminance sensor 190 in the OLED panel 243 to the display control unit 70, a correction amount is calculated such that brightness and white balance of the OLED panel 223 and brightness and white balance of the OLED panel 243 are brought closer to each other.

In addition, in the present exemplary embodiment, a change in brightness of the light-emitting element 130 is compensated for by the illuminance adjustment units 305 and 315 incorporated into the respective display devices 22 and 24, but the processing performed in the illuminance adjustment units 305 and 315 may be performed in the control circuits 303 and 313. Furthermore, the processing in the illuminance adjustment units 305 and 315 may be performed by the display control unit 70. In the latter case, the image signals SR and SL are processed in advance into signals for which the change in brightness of the light-emitting element 130 is compensated for, in the display control unit 70.

B. Second Exemplary Embodiment

In the first exemplary embodiment described above, the change in brightness of the light-emitting elements 130 for the respective colors is detected using the illuminance sensor 190 to determine the correction amounts αr, αg, and αb, but when the relationships in FIG. 11 and FIG. 12 are established between the cumulative use time t and the brightness of the light-emitting element 130 for the respective colors, and reproducibility can be expected, the illuminance adjustment units 305 and 315 may determine the correction amounts αr, αg, and αb along with the cumulative use time t for the light-emitting elements 130 for the respective colors, without using the illuminance sensor 190. The correction amounts αr, αg, and αb may be determined according to a look-up table referred to by the cumulative use time t, as in the above-described exemplary embodiment, or may be determined using a function representing the relationships illustrated in FIG. 11 and FIG. 12.

In the second exemplary embodiment, it is not necessary to provide the illuminance sensor 190, making it possible to make a circuit configuration simpler. Additionally, since an area for the illuminance sensor 190 in all the pixels PX is not required, an area of a light-emitting unit can be increased and brightness of the OLED panels 223 and 243 can be increased. Since what is measured is the cumulative usage time, errors due to a deterioration in accuracy of the illuminance sensor 190 itself does not affect.

C. Third Exemplary Embodiment

Figure 13:
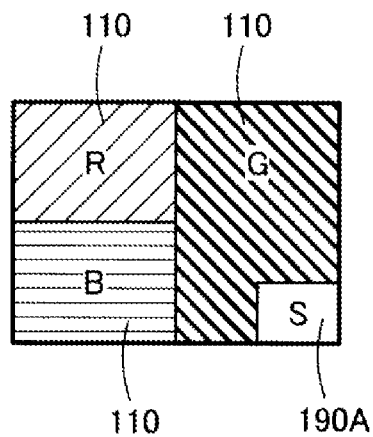
FIG. 13 is an explanatory diagram illustrating another example of arrangement of light-emitting elements and a sensor constituting a pixel.
Figure 14:
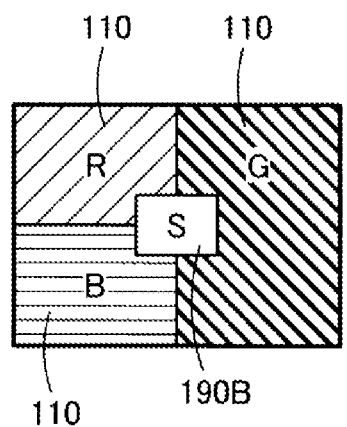
FIG. 14 is an explanatory diagram illustrating another example of arrangement of light-emitting elements and a sensor constituting a pixel.

The pixel circuits 110 for the respective colors RGB and the illuminance sensors 190 of the first exemplary embodiment are arranged as illustrated in FIG. 3B, but arrangement of these is arbitrary. For example, in the third exemplary embodiment, as illustrated in FIG. 13, a size of an illuminance sensor 190A is decreased, and an area of the pixel circuit 110 for the luminescent color G is increased, among the respective pixel circuits 110 for RGB constituting a pixel, by the decreased amount. Also, as illustrated in FIG. 14, an illuminance sensor 190B may be arranged near a center adjacent to all the respective pixel circuits 110 for RGB. In this way, an area of the light-emitting unit can be increased, so brightness of the OLED panels 223 and 243 can be increased.

D. Fourth Exemplary Embodiment

Figure 15:
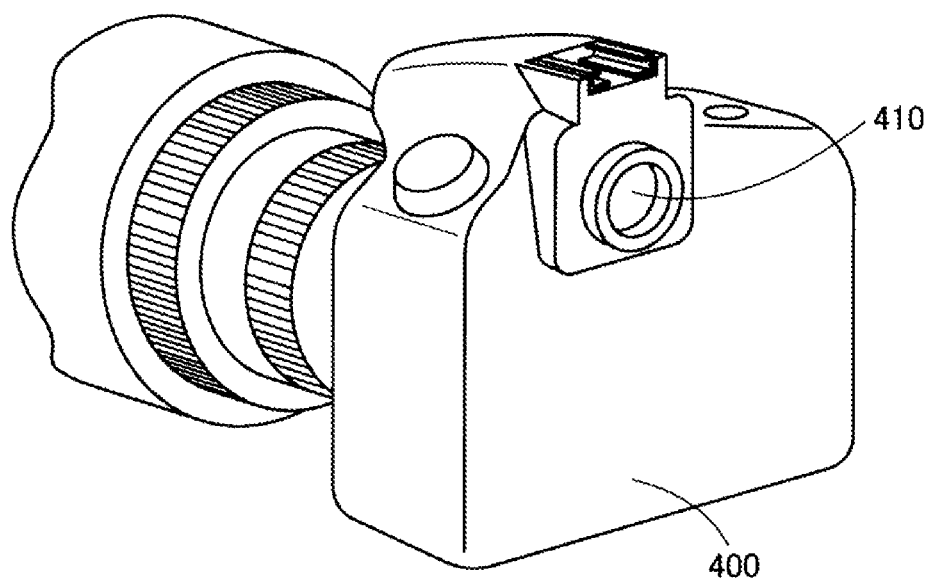
FIG. 15 is an external view of a camera in which a display device according to a second exemplary embodiment is incorporated.
Figure 16:
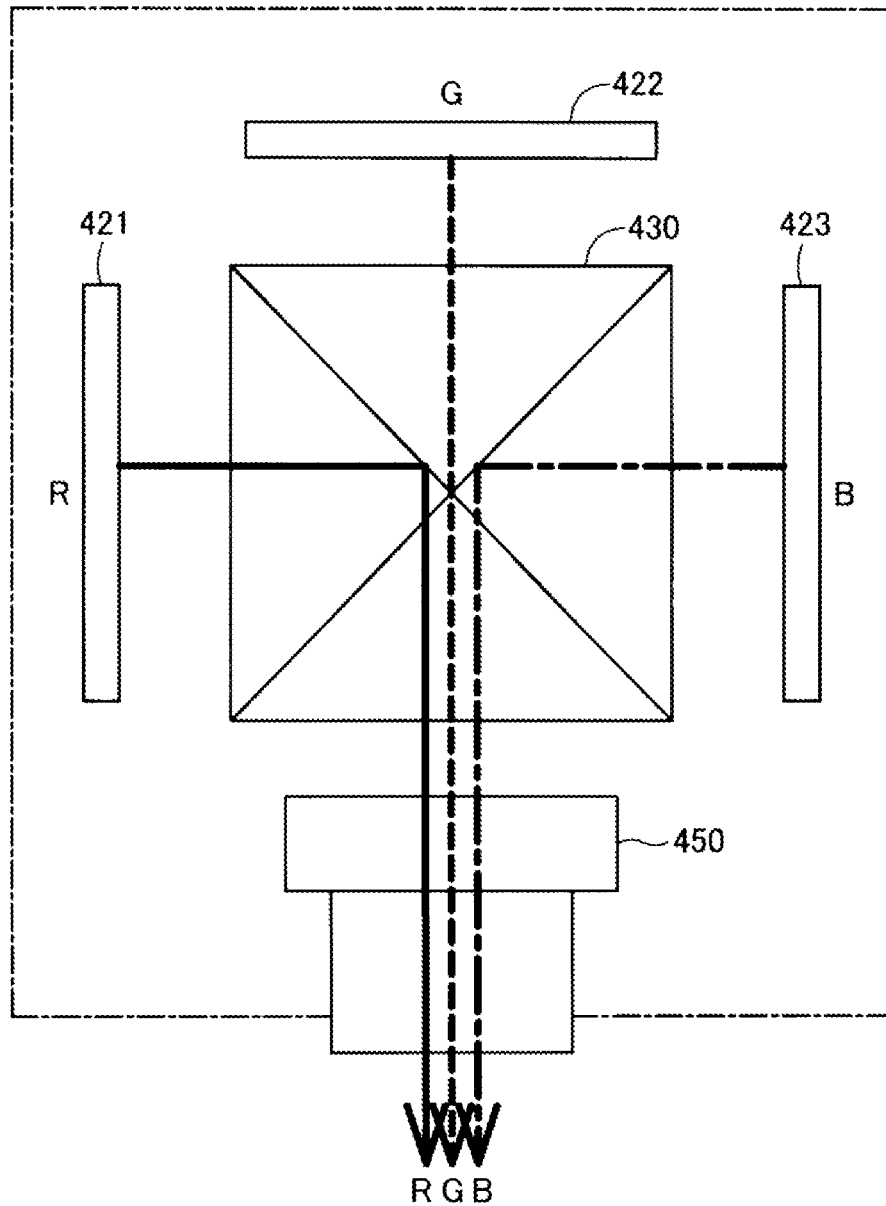
FIG. 16 is a main part schematic configuration diagram illustrating a main part of the display device according to the second exemplary embodiment.

In the first to third exemplary embodiments described above, the two display devices are incorporated into the head-mounted display apparatus 20 enabling binocular view, but the display device may be used alone. A display device 410 according to a fourth exemplary embodiment is incorporated as an electronic finder of a camera 400, as illustrated in FIG. 15. As illustrated in FIG. 16, the display device 410 includes display panels 421, 422, and 423 that individually display images of the colors RGB, respectively, a dichroic prism 430, and an eyepiece 450. Each of the display panels 421, 422, and 423 has a configuration similar to that of the OLED panel 223 according to the first exemplary embodiment, but only the light-emitting element 130 emitting light having a wavelength of the luminescent color R is arranged in the display panel 421, only the light-emitting element 130 emitting light having a wavelength of the luminescent color G is arranged in the display panel 422, and only the light-emitting element 130 emitting light having a wavelength of the luminescent color B is arranged in the display panel 423. For this reason, the display panel 421 displays an image of the color R by itself, the display panel 422 displays an image of the color G by itself, and the display panel 423 displays an image of the color B by itself.

Light beams from the respective three display panel 421, 422, and 423 are individually incident on the dichroic prism 430, and are synthesized by the dichroic prism 430. Thus, according to an image signal outputted from a display control unit (not illustrated), images formed on the respective display panels 421, 422, and 423 are synthesized into one image by the dichroic prism 430. When this image is visually recognized through the eyepiece 450, the display device 410 functions as the electronic finder of the camera 400.

In the display device 410 as the fourth exemplary embodiment as well, as in the first exemplary embodiment, an illuminance adjustment unit is incorporated, thus, even when brightness of the light-emitting element 130 deteriorates over time, this can be compensated for to suppress a change in illuminance for each luminescent color. Since the electronic finder is required to have accurate display colors, an advantage that the display color can be accurately reproduced by compensating for a change in brightness of the light-emitting element 130 for each luminescent color is significant. In the first exemplary embodiment, the ratio of the default maximum brightness to the rated current of the light-emitting element is set to 80%, but in applications such as electronic finders, the maximum brightness is required to be increased to improve reproducibility of display colors, and thus, it is also desirable to further decrease the ratio of the maximum brightness, to increase a range in which a decrease in brightness of the light-emitting element can be supported. In addition, in the first exemplary embodiment, the correction amounts αr, αg, and αb are determined from a proportional relation in respective cases where the luminance of the light-emitting element 130 is reduced by Δr, Δg, and Δb % from the brightness in the standard state, but both are not necessarily in a linear relationship, thus it is also desirable to determine a relationship between a ratio of a decrease in brightness and a correction amount compensating for this in advance to create a lookup table, to accurately compensate for a decrease in brightness of the light-emitting element with reference to the lookup table.

In the present exemplary embodiment, a dichroic prism is used to synthesize the luminescent colors RGB, but the synthesis of the three primary colors may be achieved by other techniques such as a combination of half mirrors. Furthermore, the present disclosure is not limited to an electronic finder, and may be used as a head-mounted display apparatus of the first exemplary embodiment, or may be used as a display device such as a television, a projector, or the like.

In each of the above-described exemplary embodiments, luminescent colors to be synthesized are not limited to the three primary colors, and any light of a wavelength may be used, as long as two or more kinds of luminescent colors are used.

E. Other Exemplary Embodiments

The present disclosure also includes the following exemplary embodiments.

(1) An aspect according to the present disclosure is a display device that includes a display unit at which a plurality of light-emitting elements having different luminescent colors are arranged, illuminance of the light-emitting element varying in accordance with supplied power, a change amount acquisition unit configured to acquire a change amount of illuminance of the luminescent color of the light-emitting element, and a calculation unit configured to, based on the change amount acquired for each light-emitting element of each luminescent color, calculate drive power to supply to the light-emitting element in order to reduce the change amount, and a display control unit configured to control light emission of the light-emitting element, with the calculated drive power, to control display on the display unit.

In this way, even when the illuminance of the plurality of light-emitting elements having luminescent colors different from each other changes, a change in a display color in the display unit due to this change can be suppressed. A change that occurs in the light-emitting element tends to occur as a change in brightness, particularly as a decrease in brightness, but what is visible is a change in illuminance as the display unit. Thus, this display device acquires a change amount in the illuminance. The change amount in the illuminance may be detected by providing a sensor, or may be estimated from power consumption and a calorific value of the light-emitting element, by determining energy indirectly changed to light. Alternatively, when brightness of the light-emitting element has a strong correlation with cumulative usage time, the correlation may be used to estimate the change amount from the cumulative usage time.

(2) In the above display device, the luminescent colors of the plurality of light-emitting elements are three primary colors, a white balance unit is included that adjusts power supplied to each light-emitting element at predetermined timing, and sets a white color displayed on the display unit to a predetermined color temperature, and the change amount acquisition unit may acquire the change amount as a change amount from the illuminance of the luminescent color at the timing. In this way, a change in the white balance of the display unit can be suppressed when the brightness of the light-emitting element changes. The white balance of display may be white balance according to a design value of the brightness of the light-emitting elements displaying the three primary colors respectively, or may be white balance obtained by using a color thermometer to adjust the brightness of each light-emitting element. It is sufficient that supply power corresponding to the brightness of each light-emitting element adjusted in this manner is stored, and drive power is calculated according to a change amount of subsequent illuminance, as default supply power.

(3) In the above display device, the change amount acquisition unit may include a sensor that detects illuminance of each luminescent color of the light-emitting element, and the calculation unit may calculate the drive power from the detected illuminance, and power supplied to the light-emitting element when the illuminance is detected. In this way, since the sensor is used, the change amount of the illuminance can be detected with high accuracy.

(4) In the above display device, the sensor may be provided at a position adjacent to the respective light-emitting elements of the plurality of luminescent colors arranged in the display unit. The change amount of illuminance can be detected with higher accuracy, by providing the sensor at a position adjacent to the light-emitting element. However, a sensor may also be provided away from the light-emitting element, as long as the sensor can detect the illuminance of the light-emitting element. For example, a sensor may be provided in a periphery of the display unit or the like, and when only the light-emitting element of a specific luminescent color is lit, the sensor may detect illuminance at that time, to determine a change amount of the illuminance. The detection by the sensor may be performed by lighting all the light-emitting elements of the specific luminescent color at a time, or by providing a plurality of sensors, dividing all light-emitting elements of a specific luminescent color into a plurality of groups, and lighting the light-emitting elements for each group, to determine a change amount of illuminance by the sensor provided corresponding to the group.

(5) In the above display device, the change amount acquisition unit may include a temporal change storage unit in which a relationship between cumulative usage time of the light-emitting element for each luminescent color and the illuminance in advance is stored, and a change amount calculation unit that determines the change amount by the cumulative usage time of the light-emitting element. In this way, it is possible to determine the change amount of the illuminance from the cumulative usage time, thus it is not necessary to adopt a configuration in which a sensor is incorporated into a display unit, and a device configuration can be simplified.

(6) In the above display device, the display unit may include a plurality of light-emitting panels at which the light-emitting elements of the plurality of luminescent colors are arranged separately for each luminescent color, and a light synthesizing unit that superimposes and outputs light beams of the respective luminescent colors from the plurality of light-emitting panels. In this way, the light-emitting elements of the respective luminescent colors can be formed together, so the light-emitting elements of a specific luminescent color can be arranged at a narrow pitch, and resolution of display can be improved.

(7) The present disclosure includes aspects as a head-mounted display apparatus. In the head-mounted display apparatus, the display device described above is provided for each of the right eye and the left eye, and the calculation unit modifies the drive power so as to bring brightness of an image visually recognized by a user by the display device for the right eye, and brightness of an image visually recognized by the user by the display device for the left eye close to each other.

In this way, changes in display colors of the display device for the right eye and the display device for the left eye in the head-mounted display apparatus enabling binocular view can be suppressed, and the display colors of both the display devices can be brought closer to each other.

(8) The present disclosure includes implementation as a display method in which display is performed by using a display unit at which a plurality of light-emitting elements having different luminescent colors are arranged. In this display method, a change amount of illuminance of the luminescent color of the light-emitting element is acquired, and based on the change amount acquired for each luminescent color, drive power to be supplied to the light-emitting element of each luminescent color is calculated in order to reduce the change amount, and light emission of the light-emitting element of each luminescent color is controlled with the calculated drive power, to control display on the display unit. In this way, even when the illuminance of the plurality of light-emitting elements having luminescent colors different from each other changes, a change in a display color in the display unit due to this change can be suppressed.

The above display method may also be implemented through arithmetic logic operations by a computer or the like. Accordingly, the present disclosure includes implementation as a form such as a program that causes the display method to be realized by a computer, a computer readable recording medium storing the program, and the like. The recording medium includes various forms such as a magnetic recording medium such as a flexible disk or a hard disk, a magneto-optical recording medium such as a CD-ROM or a DVD, a semiconductor storage medium such as flash ROM, a RAM backed up, and the like.

In each of the above-mentioned exemplary embodiments, part of the configuration achieved by the hardware may be replaced with software. At least some of the configurations implemented by the software may be realized by discrete circuit configurations. Further, in a case where part of the functions or the entire functions of the disclosure is achieved by the software, the software (computer program) may be provided in a form stored in a computer-readable recording medium. "Computer-readable recording medium" is not limited to a portable recording medium such as a flexible disk and a CD-ROM, but includes various internal storage devices such as a RAM and a ROM and various external storage devices fixed to a computer such as a hard disk. In other words, "computer-readable recording medium" has a broad range of definition including any recording device capable of non-transitorily and fixedly storing data packets.

The disclosure is not limited to the exemplary embodiments described above, and can be realized in various configurations without departing from the gist of the disclosure. For example, appropriate replacements or combinations may be made to the technical features in the exemplary embodiments which correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A display device, comprising:
   a display unit at which a plurality of light-emitting elements having different luminescent colors are arranged, illuminance of the light-emitting element varying in accordance with supplied power;
   a change amount acquisition unit configured to acquire a change amount of illuminance of the luminescent color of the light-emitting element;
   a calculation unit configured to, based on the change amount acquired for each light-emitting element of each luminescent color, calculate drive power to be supplied to the light-emitting element in order to reduce the change amount; and
   a display control unit configured to control light emission of the light-emitting element, with the calculated drive power, to control display by the display unit;
   wherein the change amount acquisition unit includes a sensor that detects illuminance of each luminescent color of the light-emitting element, and
   wherein the calculation unit calculates the drive power from the detected illuminance and the power supplied to the light-emitting element when the illuminance is detected.

2. The display device according to claim 1, wherein the luminescent colors of the plurality of light-emitting elements are three primary colors, a white balance unit is provided that adjusts power supplied to each light-emitting element, and sets a white color displayed at the display unit to a predetermined color temperature at predetermined timing, and the change amount acquisition unit acquires the change amount as a change amount from the illuminance of the luminescent color at the timing.

3. The display device according to claim 1, wherein the sensor is provided at a position adjacent to each of the light-emitting elements of the plurality of luminescent colors arranged at the display unit.

4. The display device according to claim 1, wherein the change amount acquisition unit includes a temporal change storage unit in which a relationship between cumulative usage time of the light-emitting element of each luminescent color and the illuminance is stored in advance, and a change amount calculation unit that determines the change amount by the cumulative usage time of the light-emitting element.

5. The display device according to claim 1, wherein the display unit includes a plurality of light-emitting panels at which the light-emitting elements of the plurality of luminescent colors are arranged separately for each luminescent color, and a light synthesizing unit that superimposes light of each of the luminescent colors from the plurality of light-emitting panels and output the superposed light.

6. A head-mounted display apparatus, comprising the display device according to claim 1 for each of the right eye and the left eye, wherein the calculation unit modifies the drive power so that brightness of an image visually recognized by a user by the display device for the right eye, and brightness of an image visually recognized by the user by the display device for the left eye are close to each other.

7. A display method for performing display using a display unit at which a plurality of light-emitting elements having different luminescent colors are arranged, the display method comprising:

acquiring a change amount of illuminance of the luminescent color of the light-emitting element;

calculating drive power to be supplied to the light-emitting element of each luminescent color in order to reduce the change amount, based on the change amount acquired for each luminescent color; and controlling light emission of the light-emitting element of each luminescent color with the calculated drive power, to control display by the display unit;

wherein a sensor detects illuminance of each luminescent color of the light-emitting element, and wherein the drive power is calculated from the detected illuminance and the power supplied to the light-emitting element when the illuminance is detected.

* * * * *